United States Patent
Miyamoto et al.

(10) Patent No.: US 10,645,244 B2
(45) Date of Patent: May 5, 2020

(54) IMAGE READING APPARATUS WITH LOAD APPLYING DEVICE

(71) Applicant: SEIKO EPSON CORPORATION, Tokyo (JP)

(72) Inventors: Shintaro Miyamoto, Shiojiri (JP); Kohei Kozaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/030,709

(22) Filed: Jul. 9, 2018

(65) Prior Publication Data

US 2019/0020778 A1 Jan. 17, 2019

(30) Foreign Application Priority Data

Jul. 11, 2017 (JP) .................................. 2017-135494

(51) Int. Cl.
*H04N 1/04* (2006.01)
*H04N 1/00* (2006.01)
*B65H 5/06* (2006.01)

(52) U.S. Cl.
CPC .......... *H04N 1/00628* (2013.01); *B65H 5/06* (2013.01); *H04N 1/00602* (2013.01); *H04N 1/00793* (2013.01); *H04N 1/00806* (2013.01); *B65H 2402/70* (2013.01); *B65H 2403/00* (2013.01); *B65H 2403/40* (2013.01); *B65H 2403/725* (2013.01); *B65H 2404/165* (2013.01)

(58) Field of Classification Search
CPC .......... H04N 1/00628; H04N 1/00602; H04N 1/00793; H04N 1/00806; B65H 5/06; B65H 2402/70; B65H 2403/00; B65H 2403/40; B65H 2403/725; B65H 2404/165
USPC .................................................. 358/498, 1.1
See application file for complete search history.

(56) References Cited

U.S. PATENT DOCUMENTS

| 5,482,265 A * | 1/1996 | Nakazato ........... G03G 15/6529 271/242 |
| 2007/0140771 A1* | 6/2007 | Yanagi ..................... B41J 11/46 400/578 |
| 2008/0150222 A1 | 6/2008 | Nakakita |
| 2012/0228822 A1* | 9/2012 | Akiyama ............... B65H 5/062 271/264 |

FOREIGN PATENT DOCUMENTS

| JP | 2003-174541 A | 6/2003 |
| JP | 2008-156088 A | 7/2008 |

* cited by examiner

*Primary Examiner* — Douglas Q Tran
(74) *Attorney, Agent, or Firm* — Workman Nydegger

(57) ABSTRACT

An image reading apparatus includes a medium support section that supports a medium before feeding, a reading section that reads the medium that feeds from the medium support section, a transport roller that is disposed upstream of the reading section and transports the medium to the reading section, and a load applying device that applies a load against rotation of the transport roller. The transport roller is disposed on a rotating shaft that extends in a medium width direction that intersects the medium transport direction, and the load applying device imparts the load by pressing a transport roller driving gear that is disposed at one end of the rotating shaft in a direction from the one end of the rotating shaft to the other end thereof.

9 Claims, 26 Drawing Sheets

FIG. 23
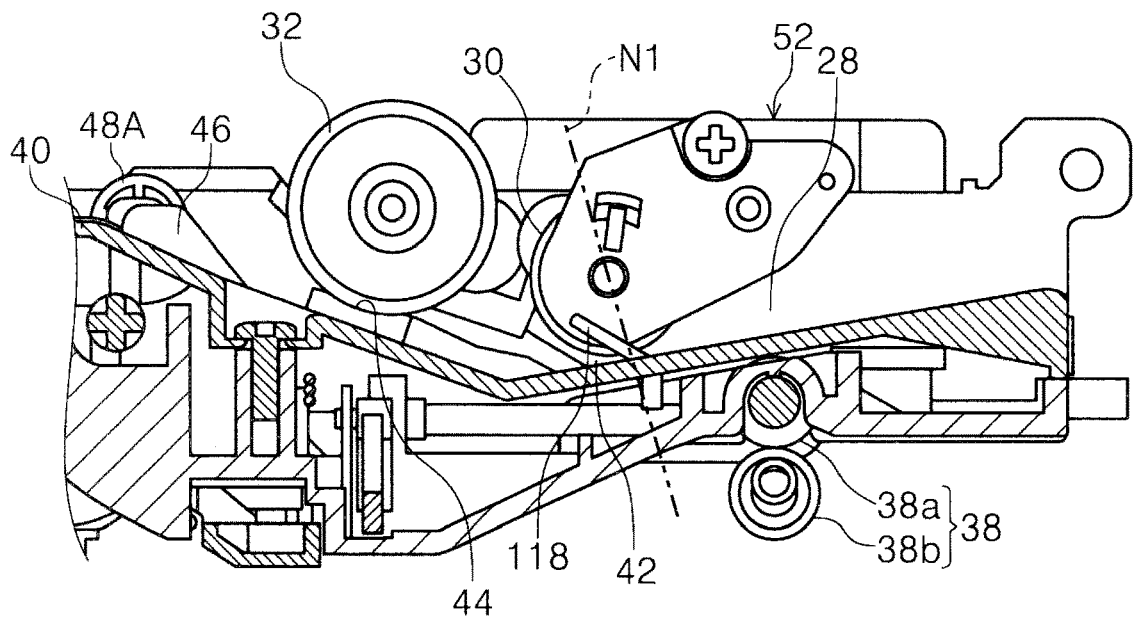
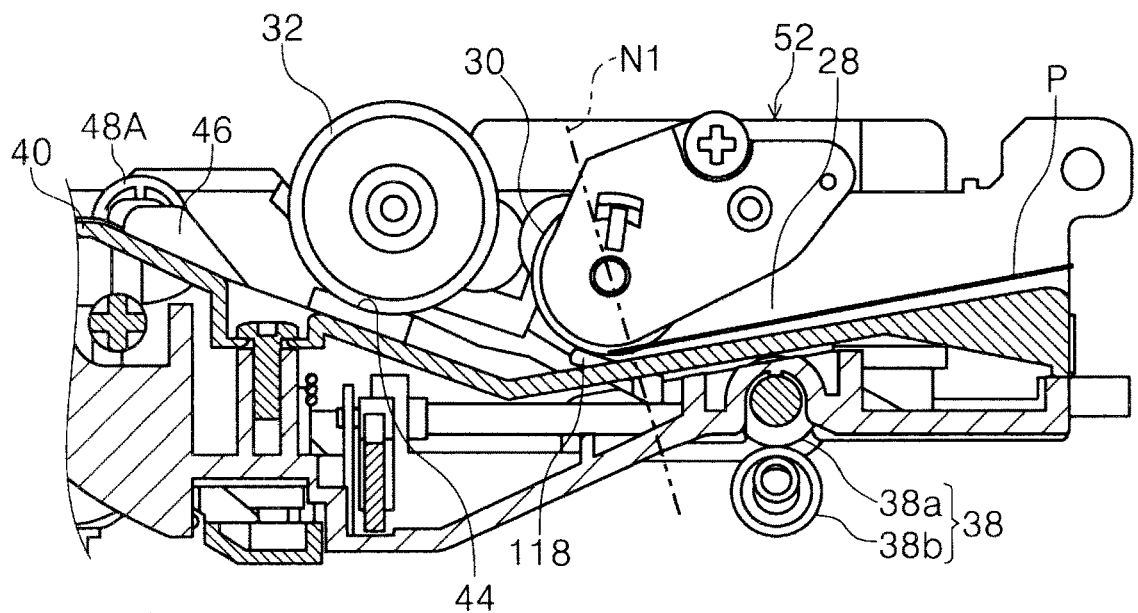

IMAGE READING APPARATUS WITH LOAD APPLYING DEVICE

BACKGROUND

1. Technical Field

The present invention relates to an image reading apparatus that reads a surface of a medium.

2. Related Art

An example of an image reading apparatus is a scanner that includes an automatic document feeder (such as "ADF", i.e., "auto document feeder") and is configured to feed and read a plurality of documents automatically. The auto document feeder is formed, for example, such that a document support section that supports documents feeds a document and the document is inverted along a U-shaped transport path, transported to a document-reading position, and subsequently read and discharged toward a discharge tray. An example of a scanner equipped with such a type of auto document feeder is described in JP-A-2008-156088.

In the auto document feeder, several rollers are disposed on the document transport path. These rollers include a feed roller that feeds a document from the document support section that supports documents before feeding and a transport roller that is disposed in a region upstream of, and close to, a reading section for reading the document and transports the document to the reading section.

In order to prevent feeding of multiple documents, for example, a separation device is disposed at a position opposing the feed roller, and the feed roller and the separation device nip an individual document so as to prevent multi-feeding. In this configuration, when the trailing end of a document comes off from a nip position between the feed roller and the separation device, the trailing end of the document may be tossed out from the nip position. As a result, the document transport speed of the transport roller disposed downstream increases temporarily, which may generate a disturbed portion in a read image (so-called "singularity"). One way to avoid such a problem is, for example, to reduce the load that is applied when the document is nipped by the feed roller and the separation device. However, this approach may degrade document separation performance.

SUMMARY

An advantage of some aspects of the invention is that an image reading apparatus that can efficiently suppress disturbance in the document transport speed when the trailing end of a document passes a nip position located upstream of a transport roller is provided.

An image reading apparatus according to an aspect of the invention includes a medium support section that supports a medium before feeding, a reading section that reads the medium that feeds from the medium support section, a transport roller that is disposed upstream of the reading section and transports the medium to the reading section, and a load applying device that applies a load against rotation of the transport roller.

According to this configuration, the image reading apparatus includes the transport roller that is disposed upstream of the reading section and transports the medium to the reading section and the load applying device that applies a load against rotation of the transport roller. Thus, when the trailing end of the medium comes off from the nip position (at which the medium is nipped) upstream of the transport roller, the load applying device applies a braking force against rotation of the transport roller, which can efficiently suppress the disturbance in the document transport speed of the transport roller.

It is preferable that in the image reading apparatus, the transport roller be disposed on a rotating shaft that extends in a medium width direction that intersects the medium transport direction, and that the load applying device impart the load by pressing a transport roller driving gear disposed at one end of the rotating shaft in a direction from the one end of the rotating shaft to the other end thereof.

According to this configuration, the load applying device imparts the load by pressing a transport roller driving gear disposed at one end of the rotating shaft in a direction from the one end of the rotating shaft to the other end thereof. This can provide the same advantages as described above.

It is preferable that the image reading apparatus further include a position regulator that regulates position of the rotating shaft in the rotation axis direction of the rotating shaft. It is also preferable that in the image reading apparatus, the position regulator be disposed at a position closer to the one end of the rotating shaft than to the other end thereof in the rotation axis direction.

According to this configuration, the position at which the load applying device imparts a load onto the rotating shaft is in a region closer to one end of the rotating shaft, and the position of the position regulator that regulates the position of the rotating shaft in the rotation axis direction is also in a region closer to the same end of the rotating shaft. This can reduce the length of section of the rotating shaft in which torsion occurs, and thereby can suppress disturbance in transport speed caused by the torsion of the rotating shaft.

It is preferable that in the image reading apparatus, at least a portion of the transport roller driving gear be present within a medium transport region in the medium width direction. According to this configuration, at least a portion of the transport roller driving gear is present within the medium transport region. As a result, the distance between the transport roller and the position at which torque is transmitted to the rotating shaft of the transport roller becomes short, thereby reducing torsion of the rotating shaft and consequently suppressing deterioration in the medium transport accuracy of the transport roller.

It is preferable that the image reading apparatus further include a gear set that transmits power from a drive source to the transport roller driving gear, and a transport path forming unit that supports the gear set on one side of the transport path forming unit in the medium width direction. It is also preferable that in the image reading apparatus, the transport path forming unit have a recess formed on the one side, and at least a portion of the gear set is present in the recess. According to this configuration, the transport path forming unit has the recess formed at the one end, and at least a portion of the gear set is present in the recess, thereby reducing an increase in the size of the apparatus caused by installation of the gear set.

It is preferable that in the image reading apparatus, the transport path forming unit include a shaft support portion that supports the rotating shaft and a lubricant retainer that retains a lubricant to be supplied to the shaft support portion.

According to this configuration, the transport path forming unit includes the shaft support portion that supports the rotating shaft and the lubricant retainer that retains a lubricant to be supplied to the shaft support portion. Thus, the lubricant supplied by the shaft support portion can reduce wear and tear of the shaft support portion and the rotating shaft.

It is preferable that in the image reading apparatus, the load applying device include a compression spring, and the compression spring exert a spring force on the spring retainer disposed in the recess and also on the transport roller driving gear. According to this configuration, the load applying device include the compression spring. The load applying device can be thereby formed in a simple structure and at a low cost.

It is preferable that in the image reading apparatus, the compression spring be fixed to the spring retainer, and a sliding member be disposed between the compression spring and the transport roller driving gear.

According to this configuration, the compression spring is fixed to the spring retainer, and the sliding member is disposed between the compression spring and the transport roller driving gear. As a result, a sliding portion where sliding occurs when the rotating shaft rotates is limited to the portion between the compression spring and the sliding member. The sliding load is maintained stable during rotation of the rotating shaft, and wear of the transport roller driving gear can be reduced.

It is preferable that in the image reading apparatus, the transport roller and the rotating shaft be formed by using two types of resin materials. According to this configuration, the transport roller and the rotating shaft are formed of resin materials by using a double-molding method. Thus, the transport roller and the rotating shaft can be formed at a low cost.

It is preferable that the image reading apparatus further include an apparatus body that includes the reading section and a placement table on which a document is placed, and a document transport apparatus that is disposed so as to be openable relative to the apparatus body and that transports the document to a reading region on the placement table. In the image reading apparatus, it is also preferable that the document transport apparatus be formed of the medium support section, the medium feed path, and the transport roller, that the apparatus body include a drive source that provides power to be transmitted to the transport roller, and the drive source be used for moving the reading section relative to the placement table, and that when the document transport apparatus is closed relative to the apparatus body, a transmission path for transmitting driving power from the drive source to the transport roller be formed.

According to this configuration, the drive source is used to drive both the document transport apparatus and the reading section, which can reduce the cost of the apparatus.

BRIEF DESCRIPTION OF THE DRAWINGS

The invention will be described with reference to the accompanying drawings, wherein like numbers reference like elements.

FIG. 23 is a cross-sectional side view illustrating a detected state and an undetected state of a document detection sensor in the transport path forming unit.

DESCRIPTION OF EXEMPLARY EMBODIMENTS

Figure 1:
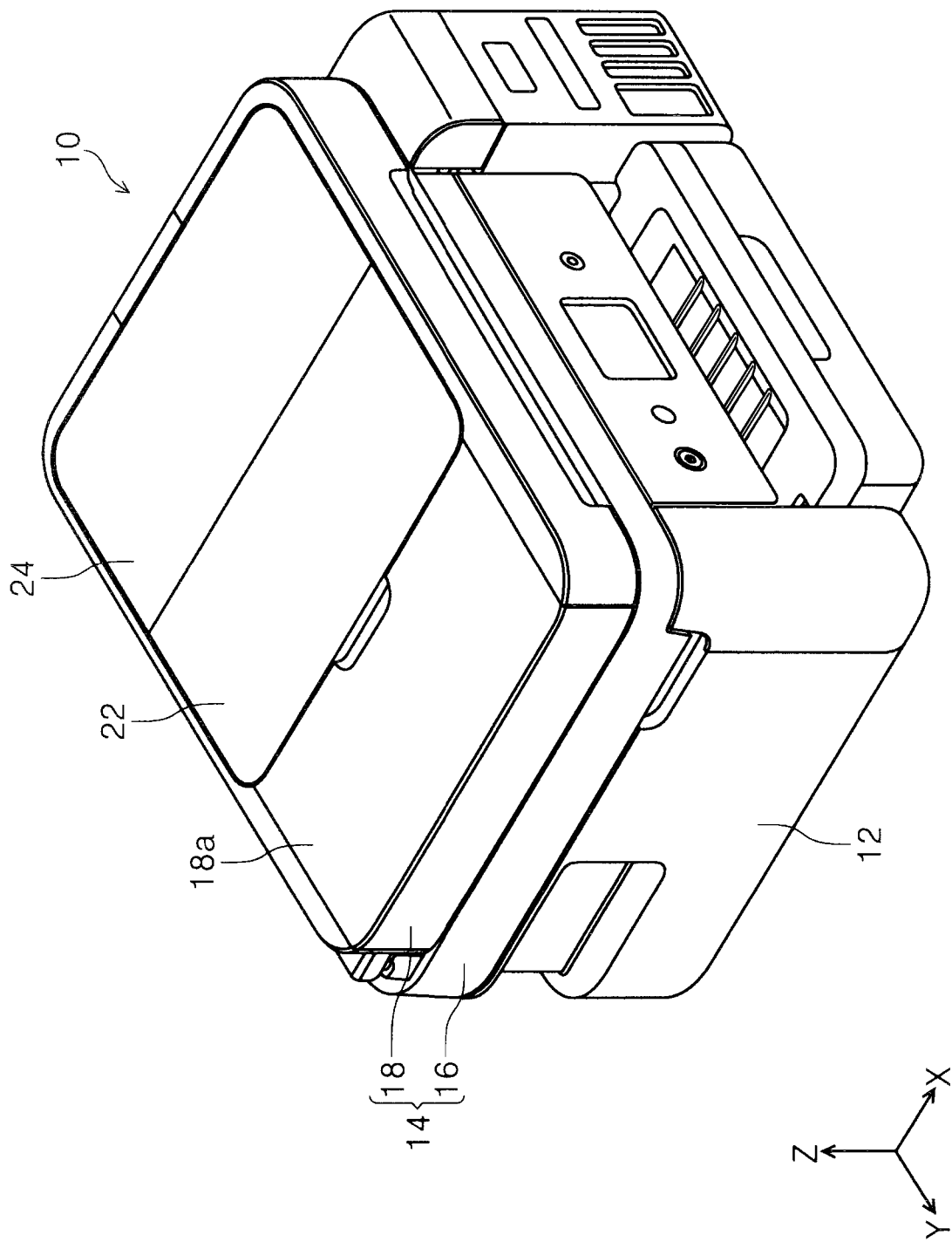
FIG. 1 is a perspective view illustrating an external appearance of a printer according to the invention.

An exemplary embodiment of the invention will be described with reference to the drawings. Note that identical elements in different embodiments will be denoted by identical reference numerals and described once in the first embodiment, and duplicated description will be omitted.

Figure 2:
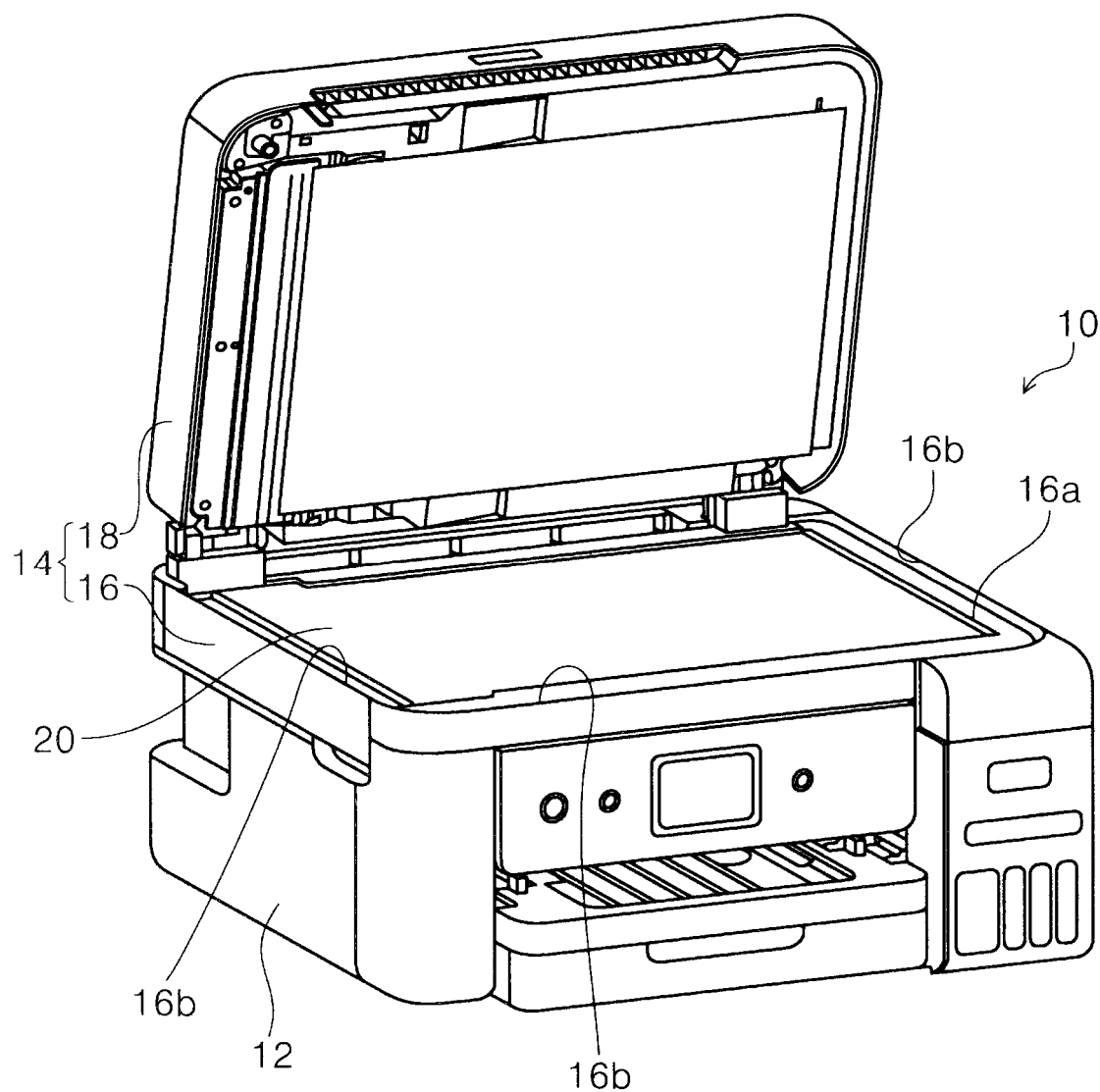
FIG. 2 is a perspective view illustrating a state of an image reading apparatus according to the invention in which a document transport apparatus is open relative to an apparatus body.
Figure 3:
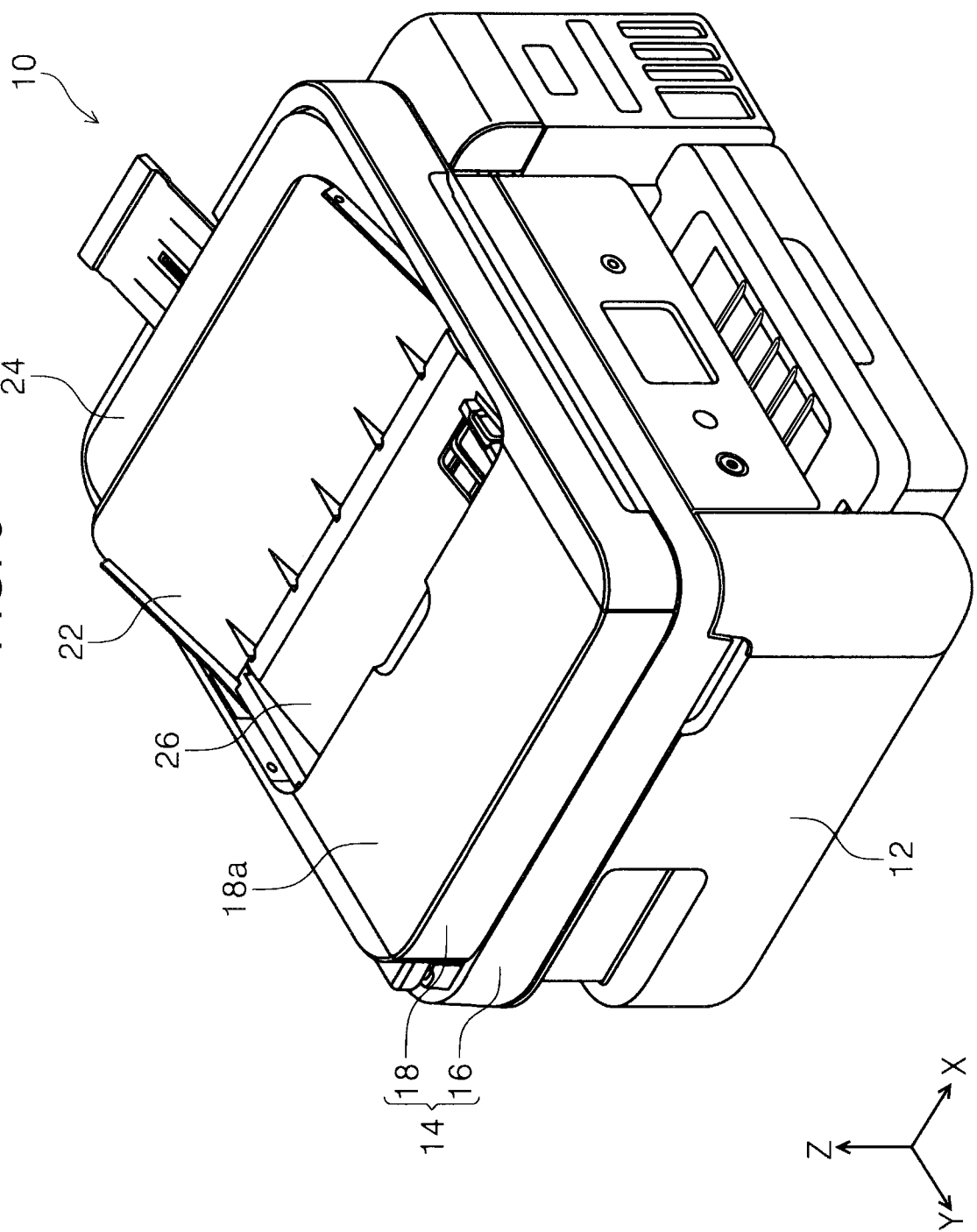
FIG. 3 is a perspective view illustrating a state of the printer in which the document transport apparatus is ready to feed a document.
Figure 4:
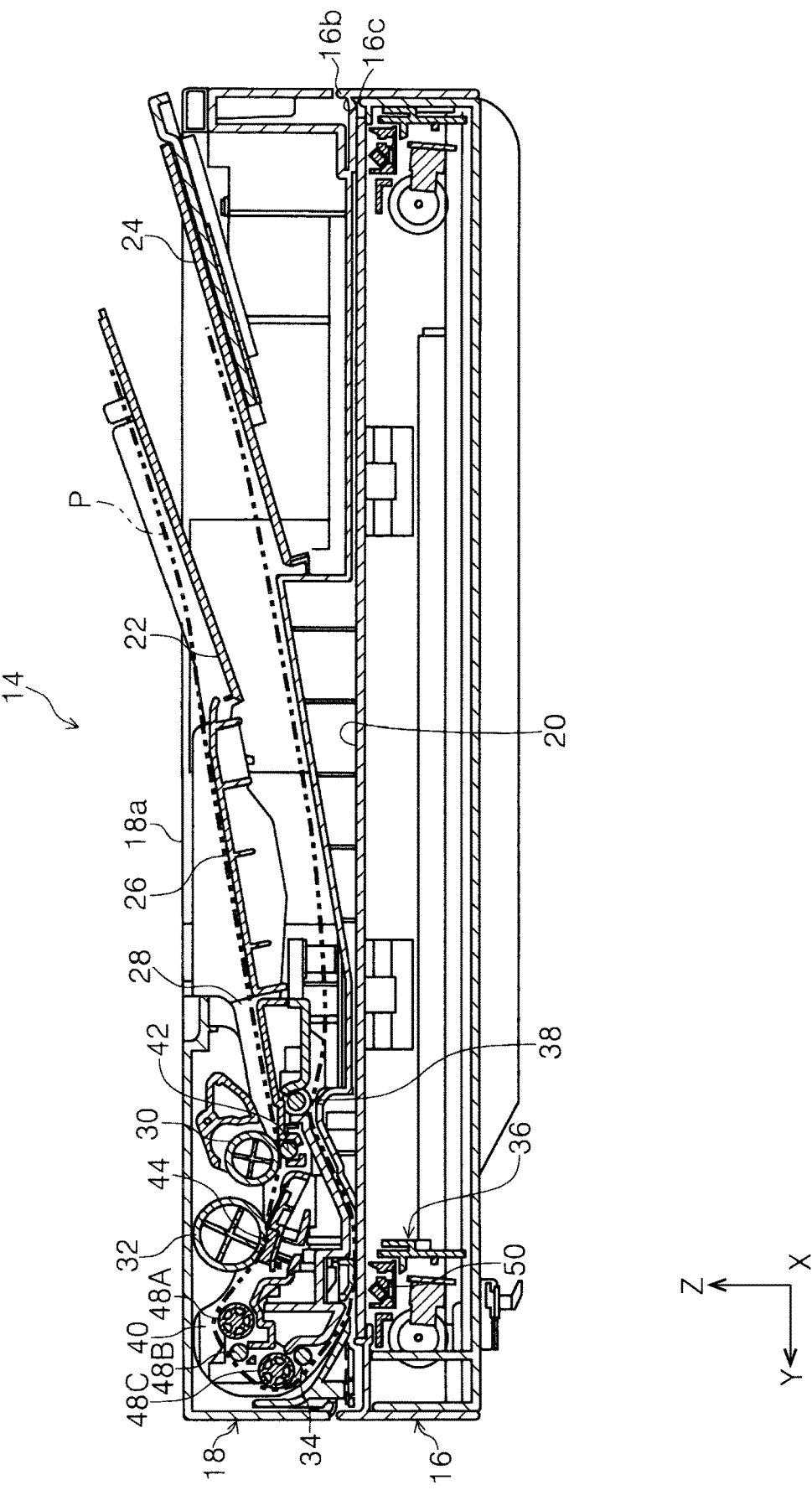
FIG. 4 is a cross-sectional side view illustrating the image reading apparatus and a document transport path in the document transport apparatus.

FIG. 1 is a perspective view illustrating an external appearance of a printer according to the invention. FIG. 2 is a perspective view illustrating a state of an image reading apparatus according to the invention in which a document transport apparatus is open relative to an apparatus body. FIG. 3 is a perspective view illustrating a state of the printer in which the document transport apparatus is ready to feed a document. FIG. 4 is a cross-sectional side view illustrating the image reading apparatus and a document transport path in the document transport apparatus.

Figure 5:
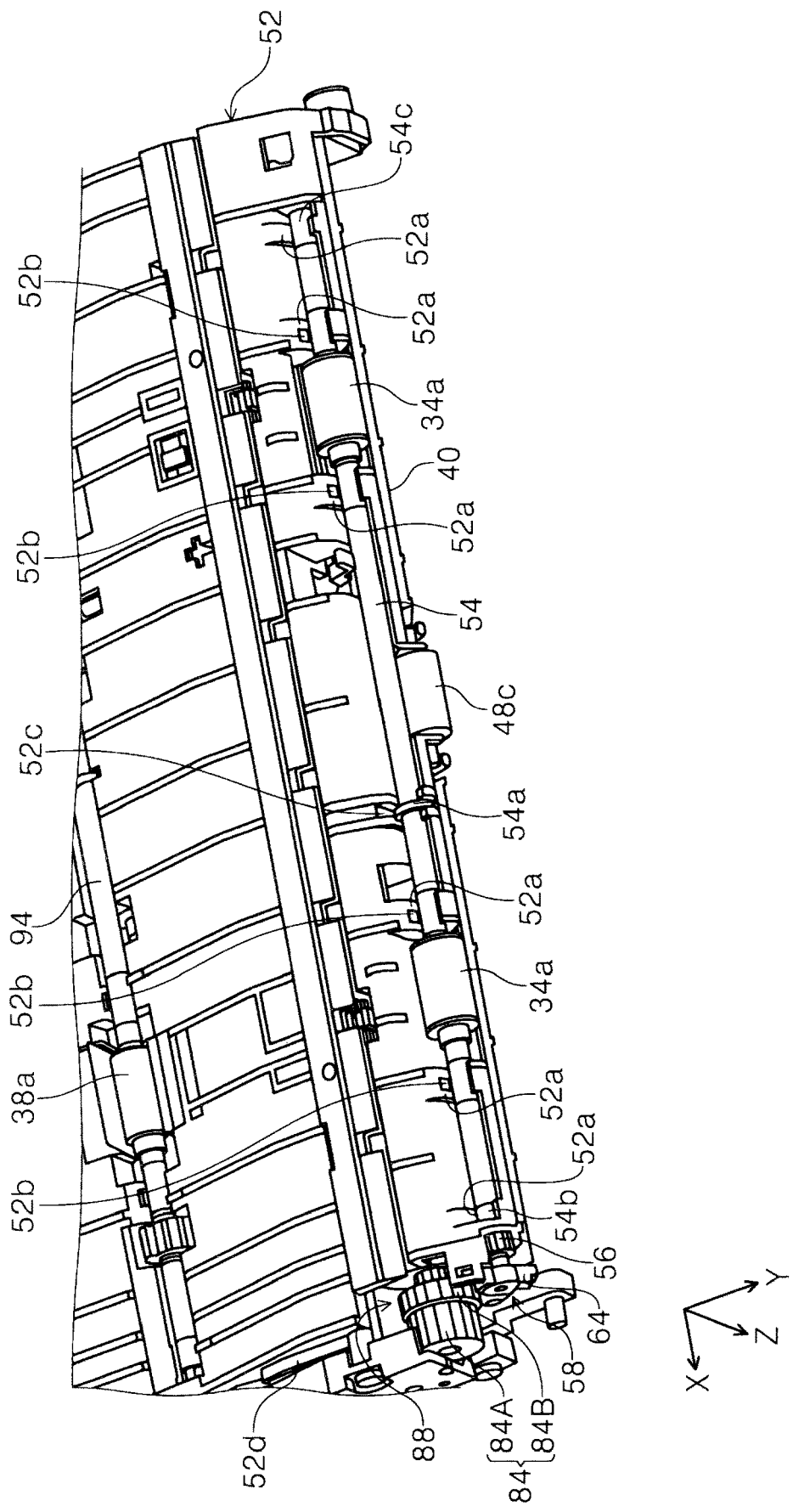
FIG. 5 is a perspective view illustrating transport rollers and a rotating shaft for the transport rollers in a transport path forming unit in the document transport apparatus.
Figure 6:
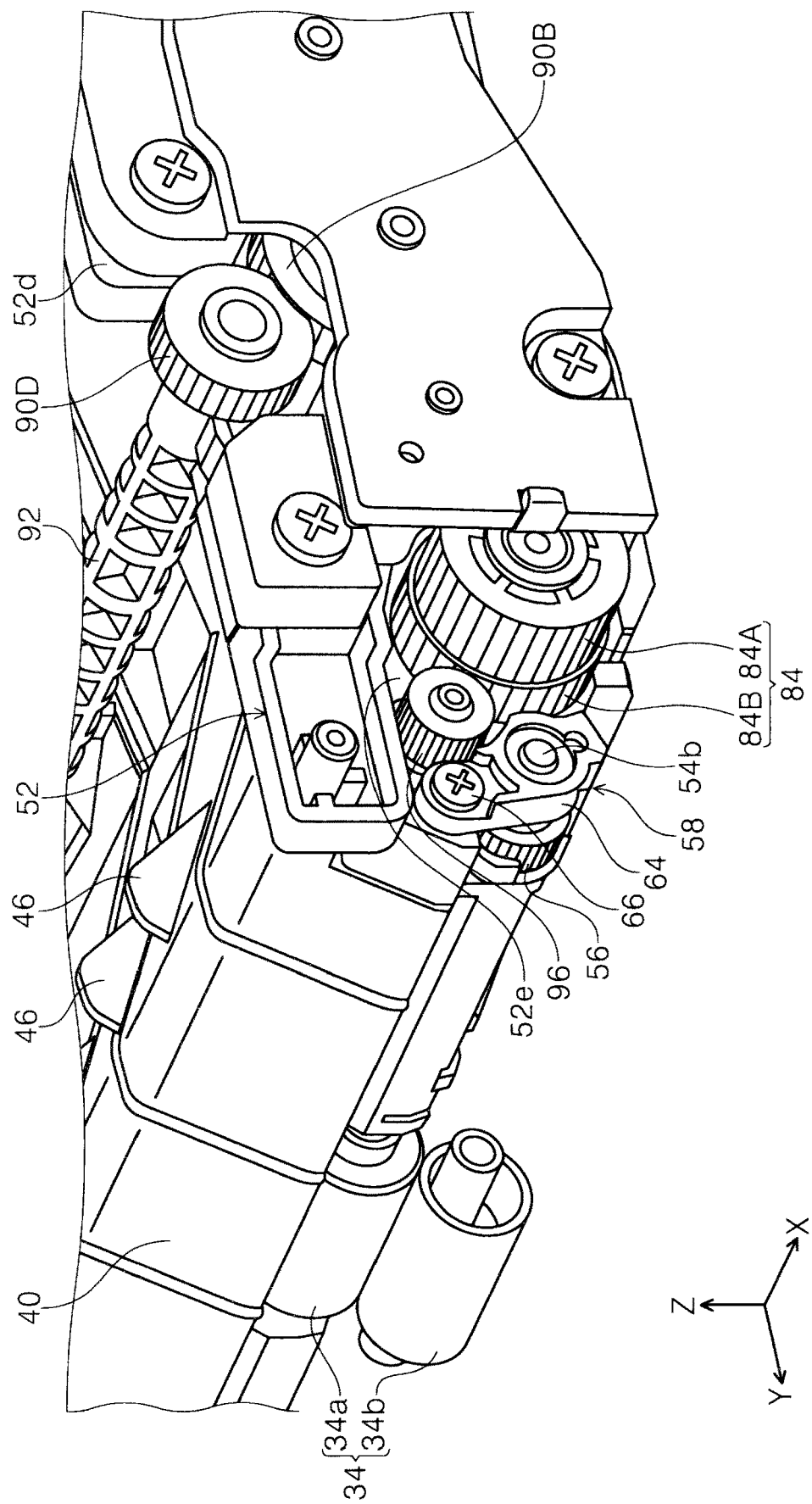
FIG. 6 is a perspective view illustrating a load applying device that imparts a load onto the rotating shaft of the transport rollers.
Figure 7:
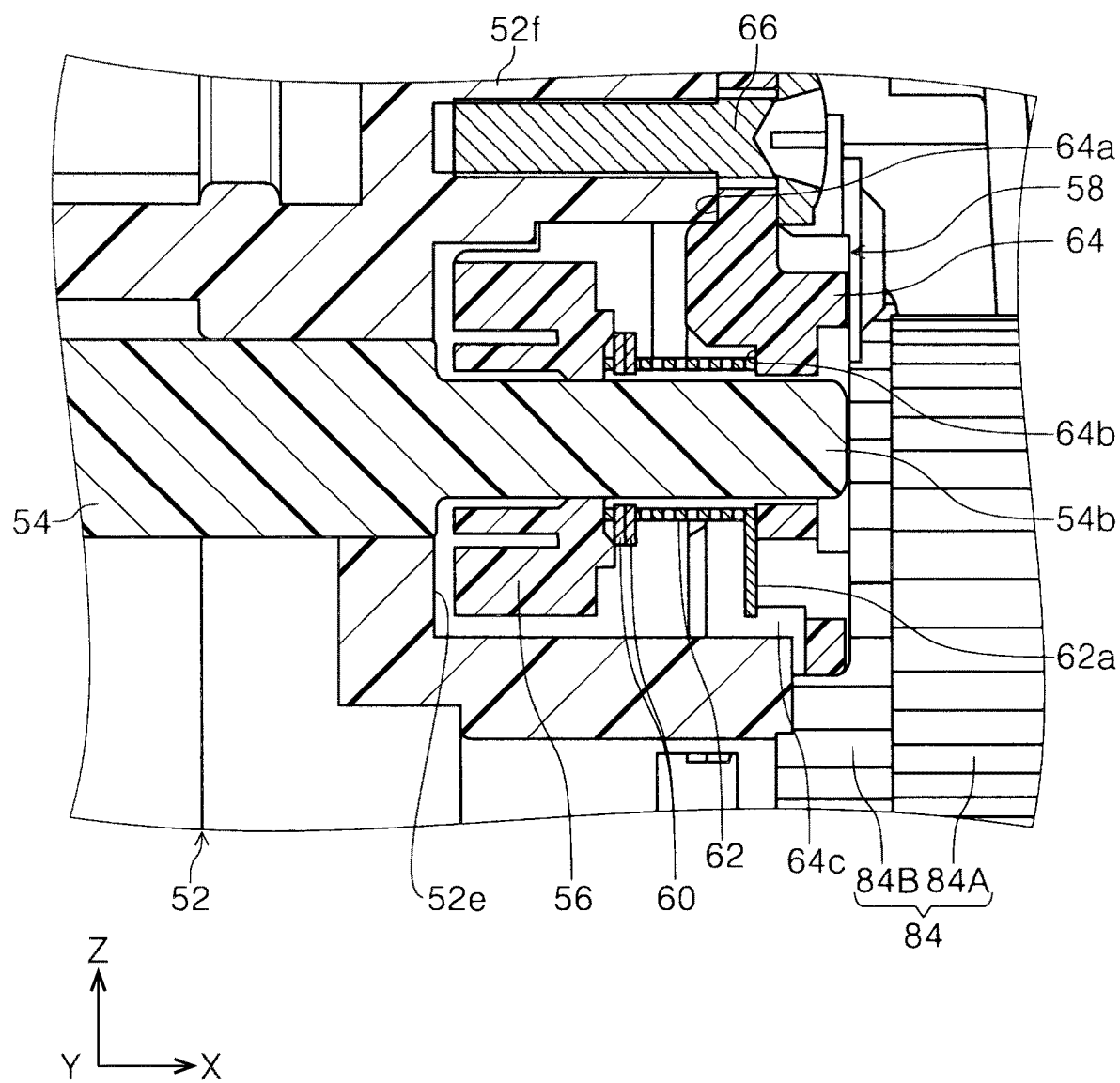
FIG. 7 is a cross-sectional side view illustrating the load applying device.
Figure 8:
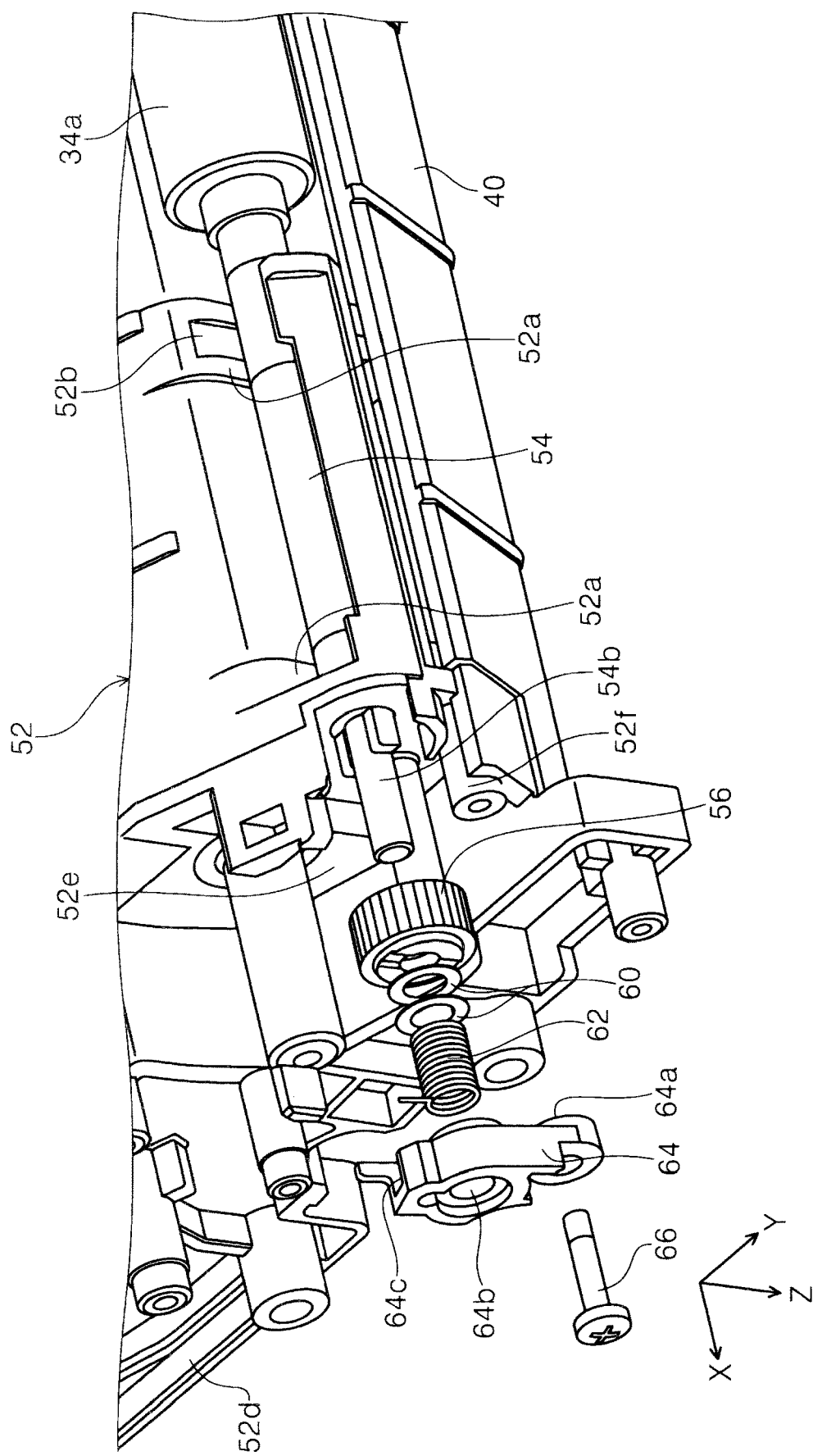
FIG. 8 is an exploded perspective view illustrating the load applying device.
Figure 9:
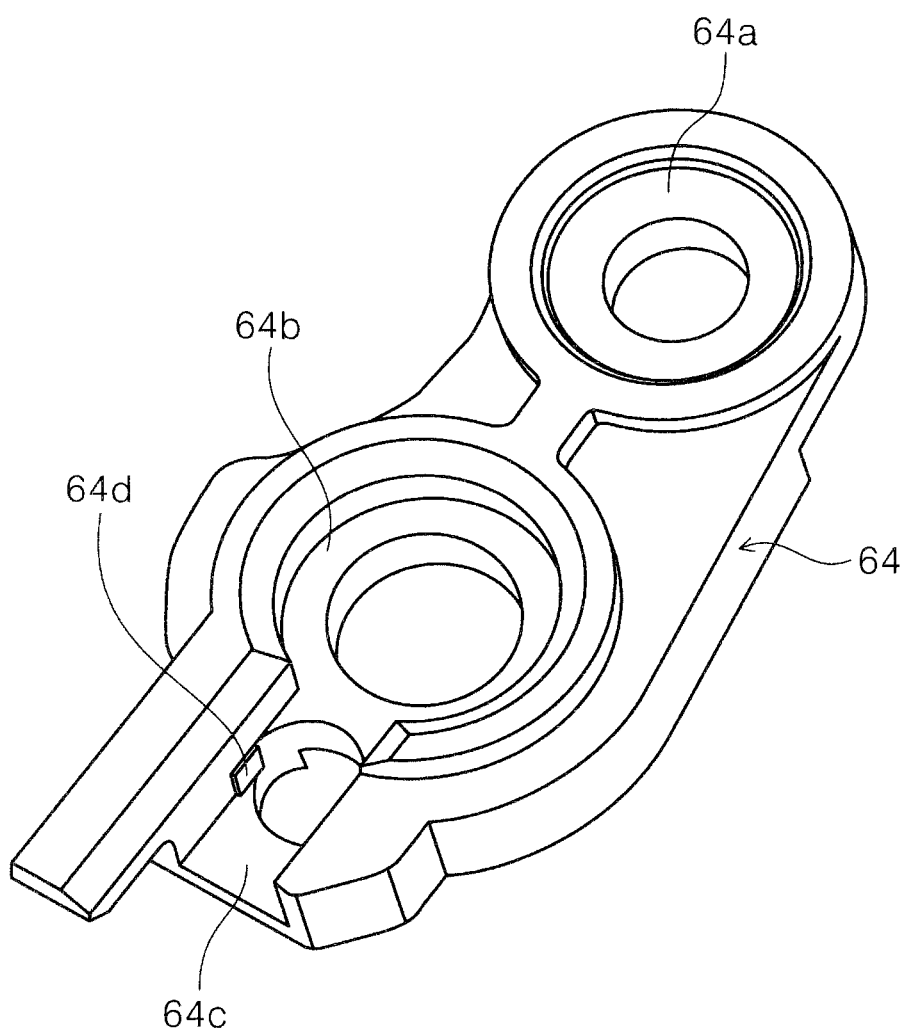
FIG. 9 is a perspective view illustrating a spring retainer.

FIG. 5 is a perspective view illustrating transport rollers and a rotating shaft for the transport rollers in a transport path forming unit in the document transport apparatus. FIG. 6 is a perspective view illustrating a load applying device that imparts a load onto the rotating shaft of the transport rollers. FIG. 7 is a cross-sectional side view illustrating the load applying device. FIG. 8 is an exploded perspective view illustrating the load applying device. FIG. 9 is a perspective view illustrating a spring retainer.

Figure 10:
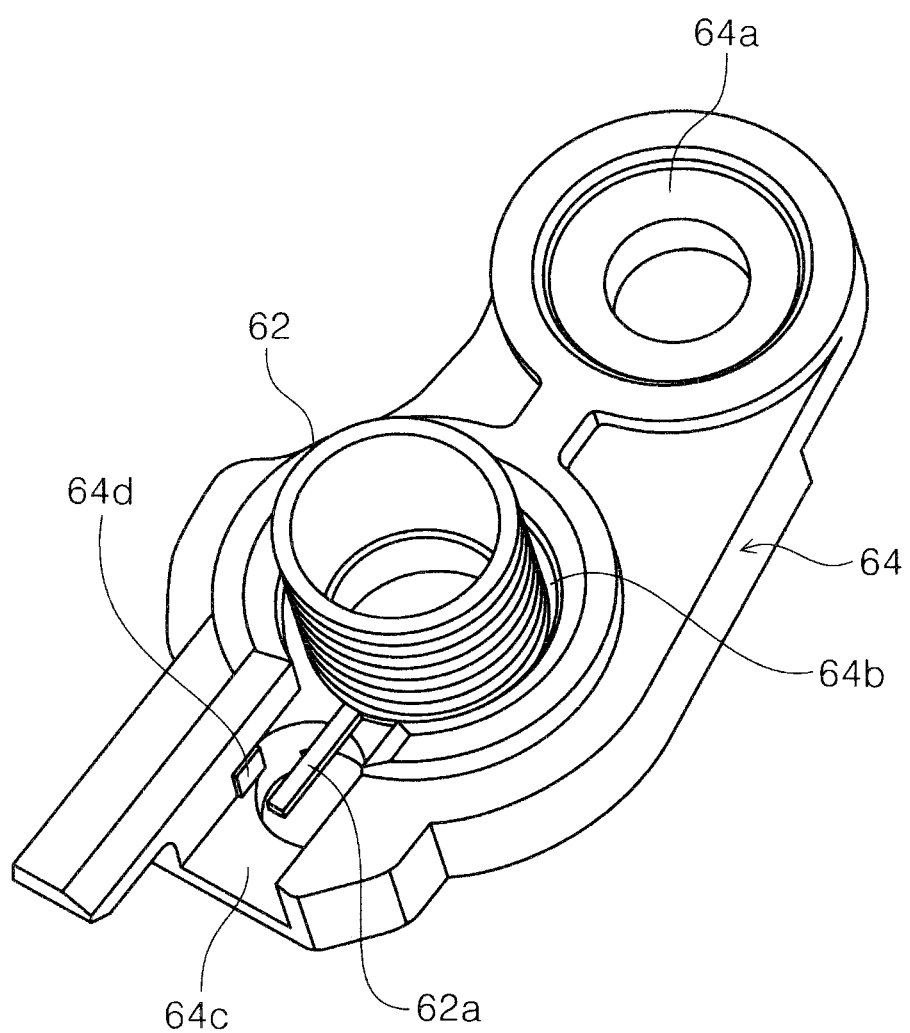
FIG. 10 is a perspective view illustrating a state in which a compression spring is fixed to the spring retainer.
Figure 11:
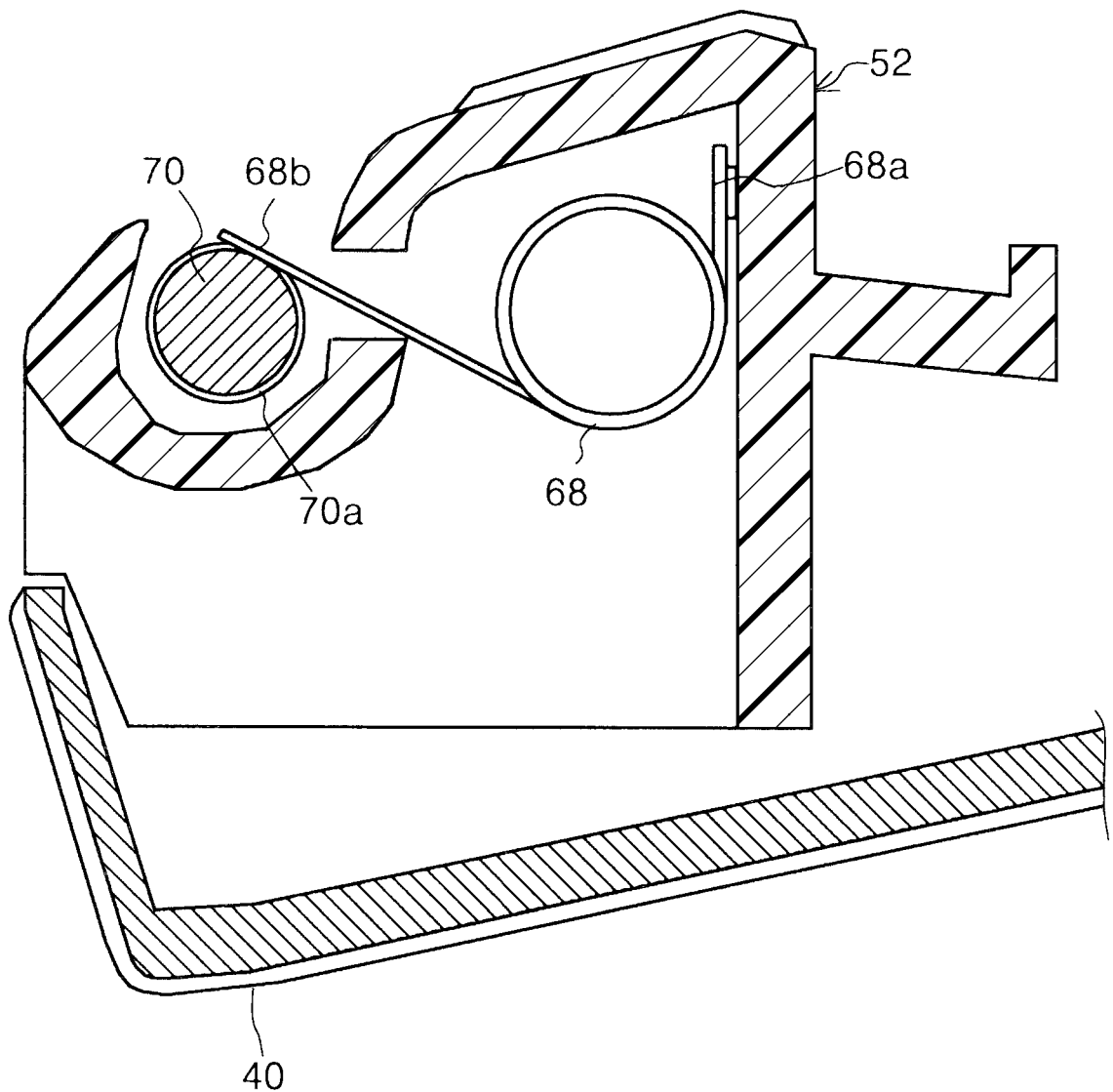
FIG. 11 is a cross-sectional side view illustrating another example of the load applying device.
Figure 12:
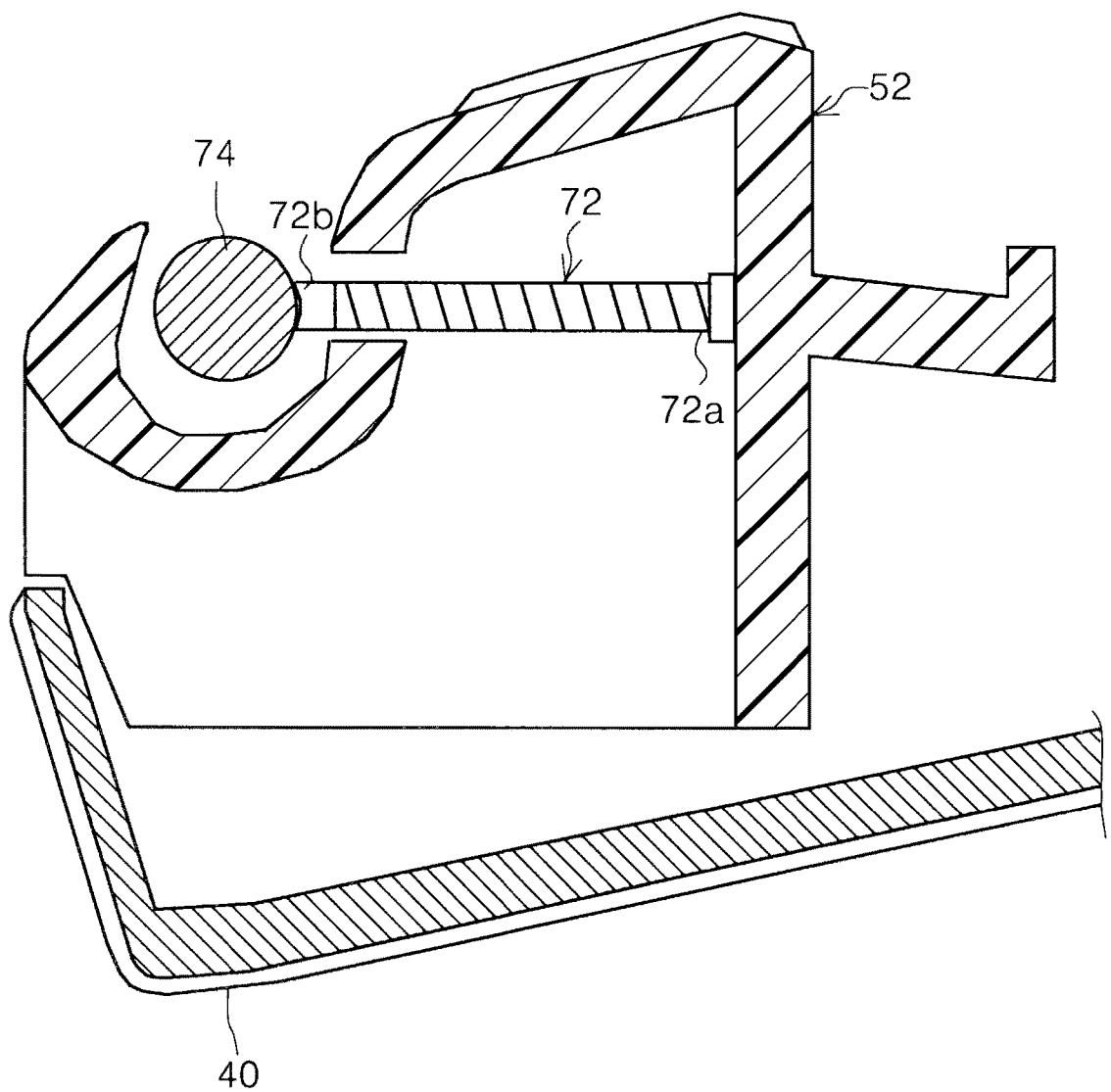
FIG. 12 is a cross-sectional side view illustrating still another example of the load applying device.
Figure 13:
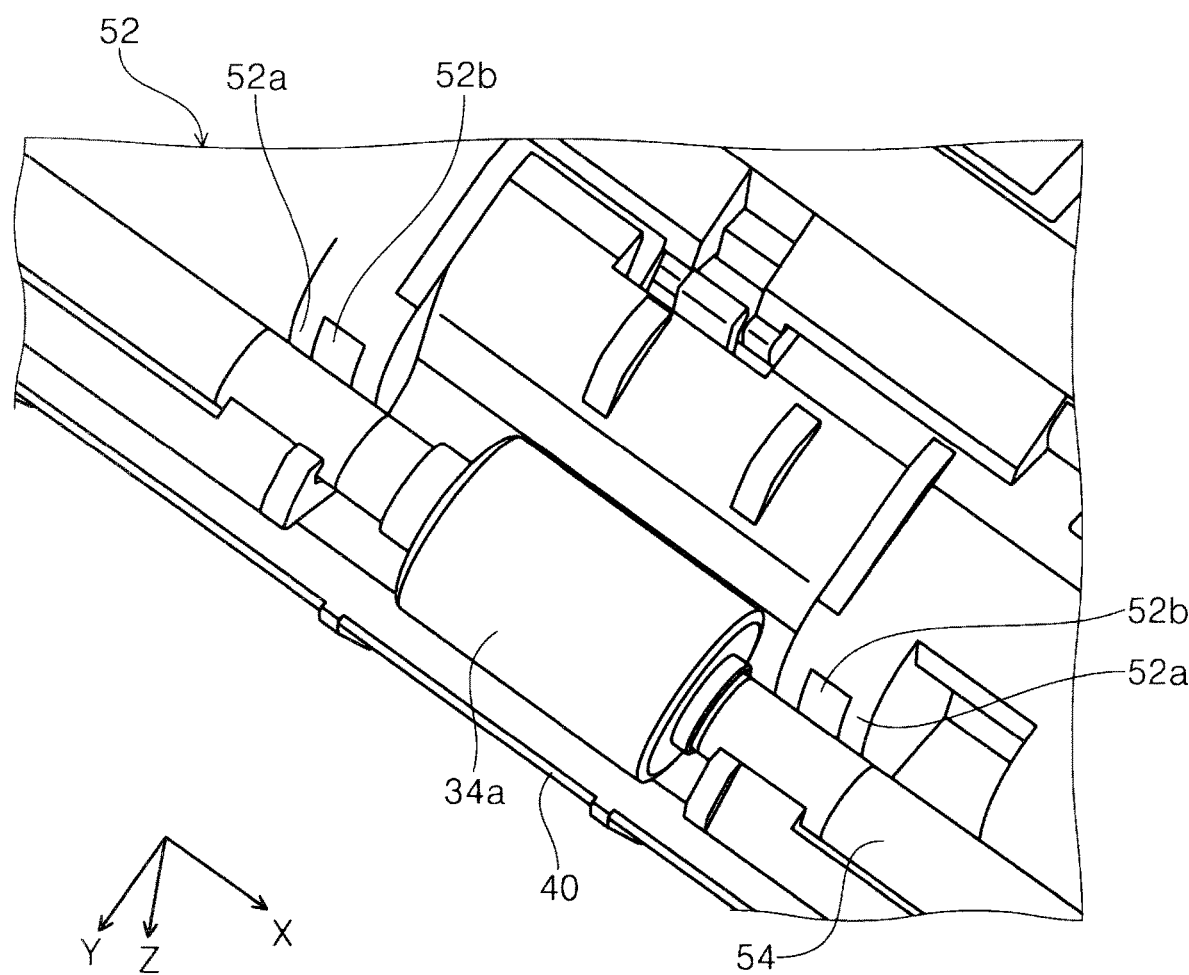
FIG. 13 is a perspective view illustrating shaft support portions for the rotating shaft and lubricant retainers.

FIG. 10 is a perspective view illustrating a state in which a compression spring is fixed to the spring retainer. FIG. 11 is a cross-sectional side view illustrating another example of the load applying device. FIG. 12 is a cross-sectional side view illustrating still another example of the load applying device. FIG. 13 is a perspective view illustrating shaft support portions for the rotating shaft and lubricant retainers.

Figure 14:
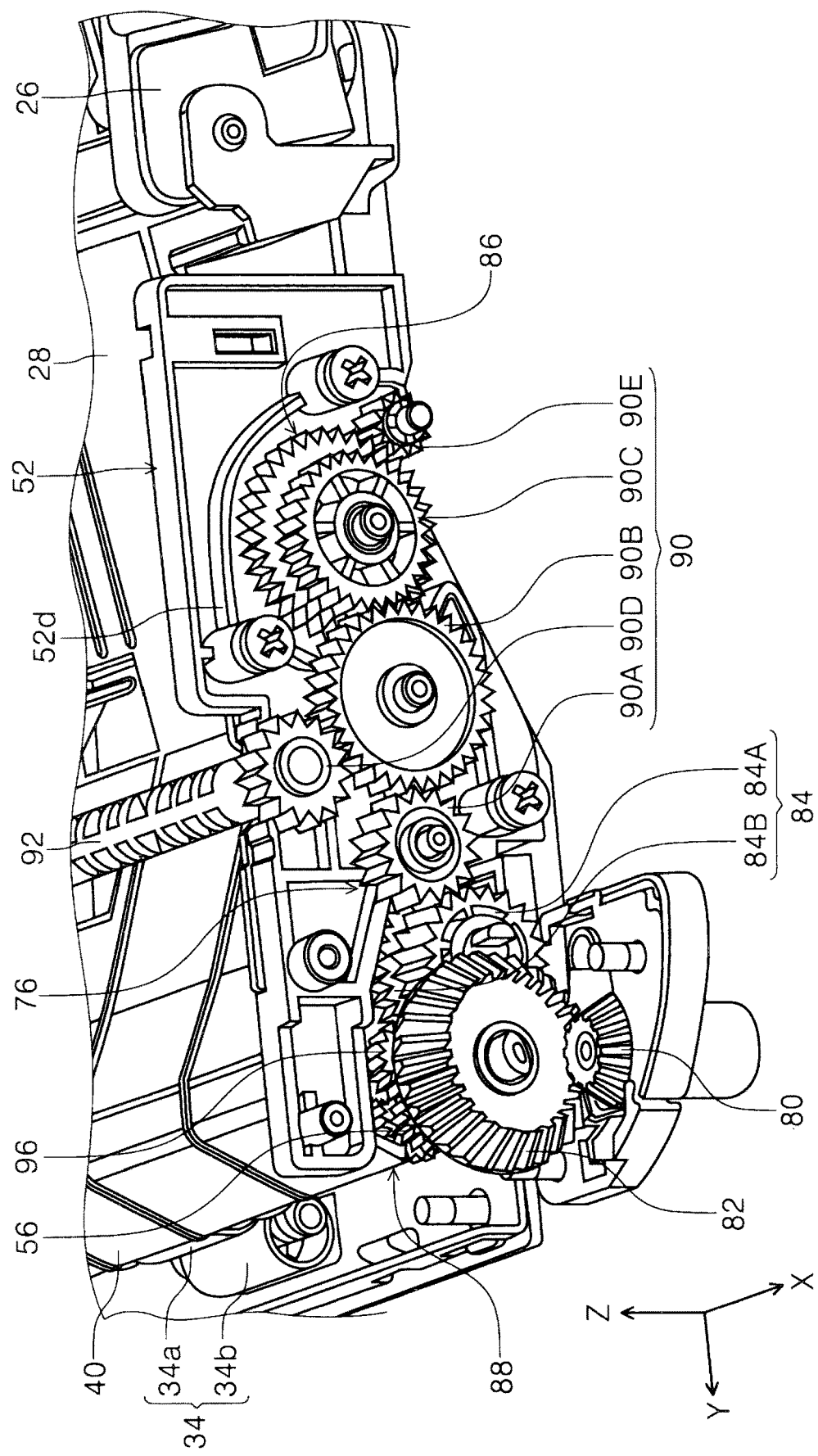
FIG. 14 is a perspective view illustrating a power transmission device in the document transport apparatus.
Figure 15:
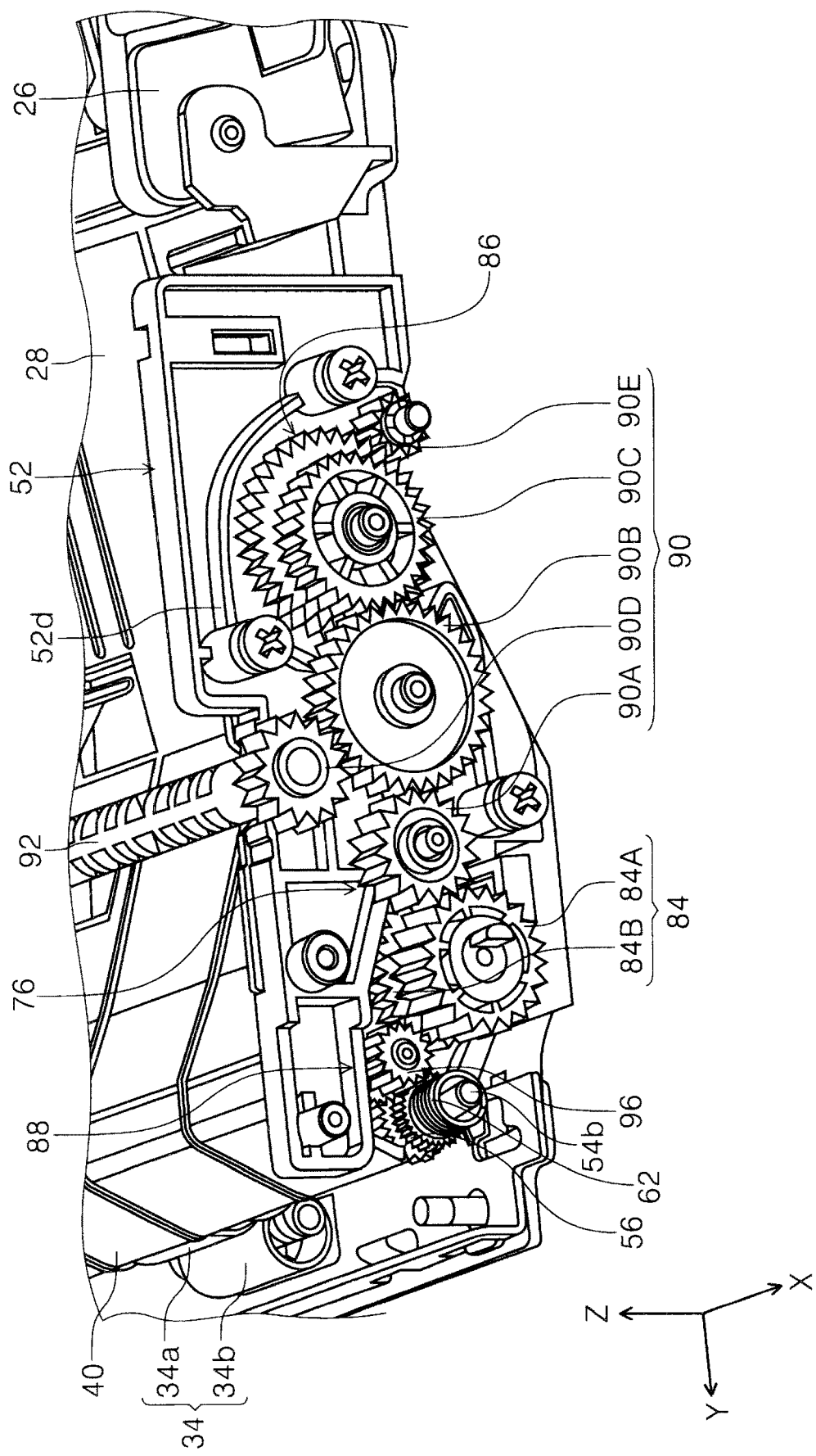
FIG. 15 is a perspective view illustrating a first power transmission path and a second power transmission path.
Figure 16:
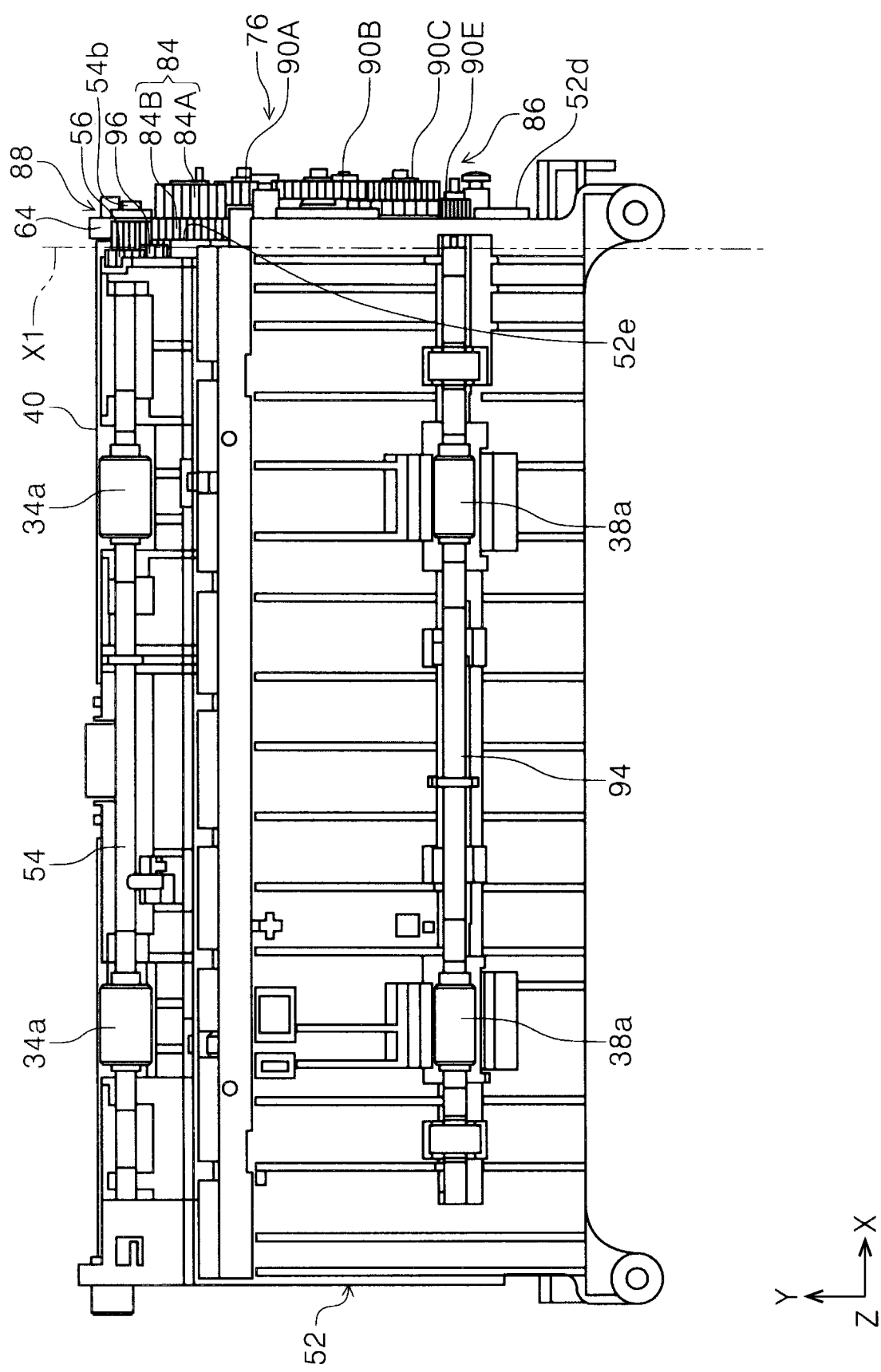
FIG. 16 is a plan view illustrating a bottom side of the transport path forming unit.
Figure 17:
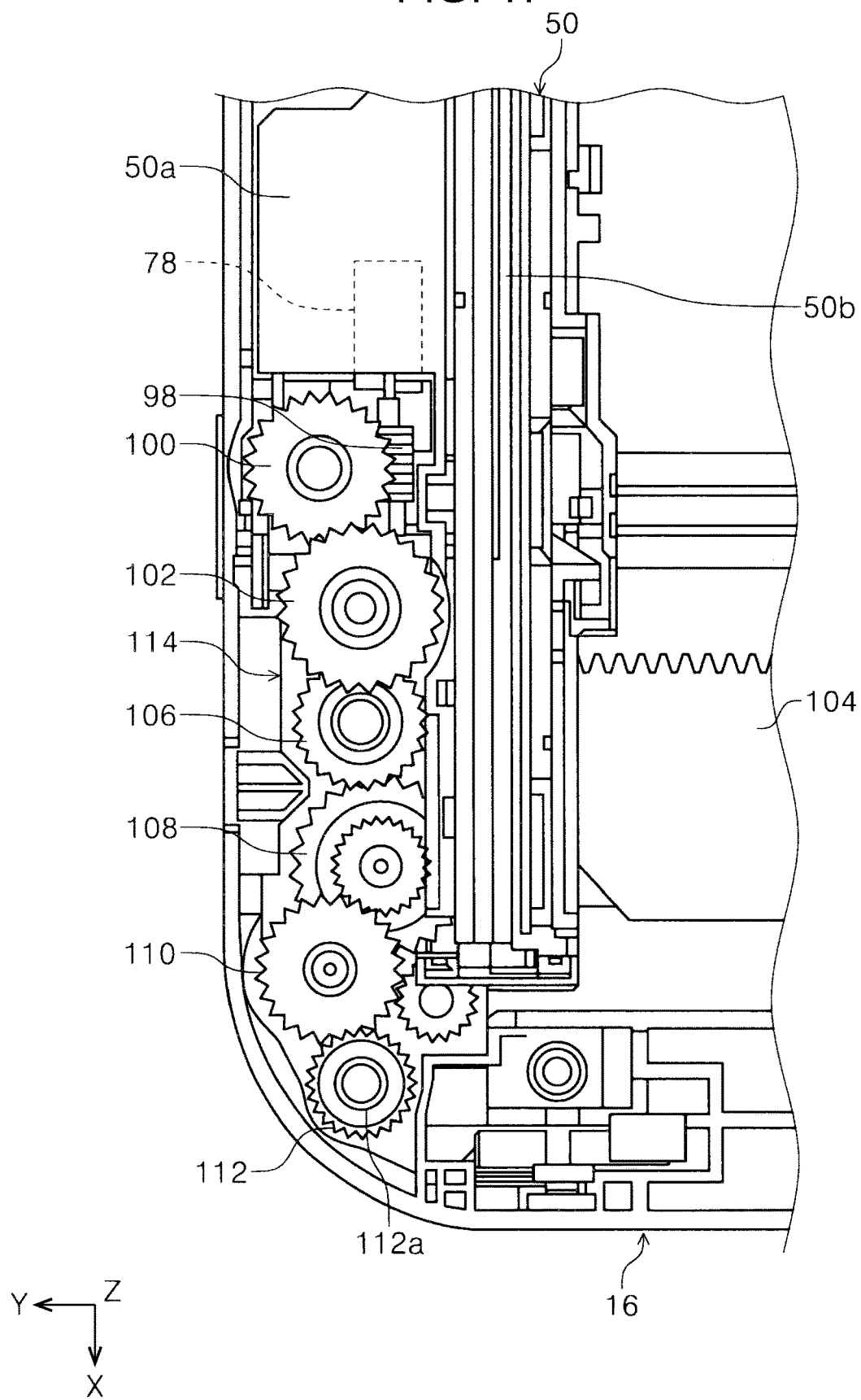
FIG. 17 is a plan view illustrating a drive motor disposed in the apparatus body and a transmission path of driving power to the power transmission device.

FIG. 14 is a perspective view illustrating a power transmission device in the document transport apparatus. FIG. 15 is a perspective view illustrating a first power transmission path and a second power transmission path. FIG. 16 is a plan view illustrating a bottom side of the transport path forming unit. FIG. 17 is a plan view illustrating a drive motor disposed in the apparatus body and a transmission path of driving power to the power transmission device.

Figure 18:
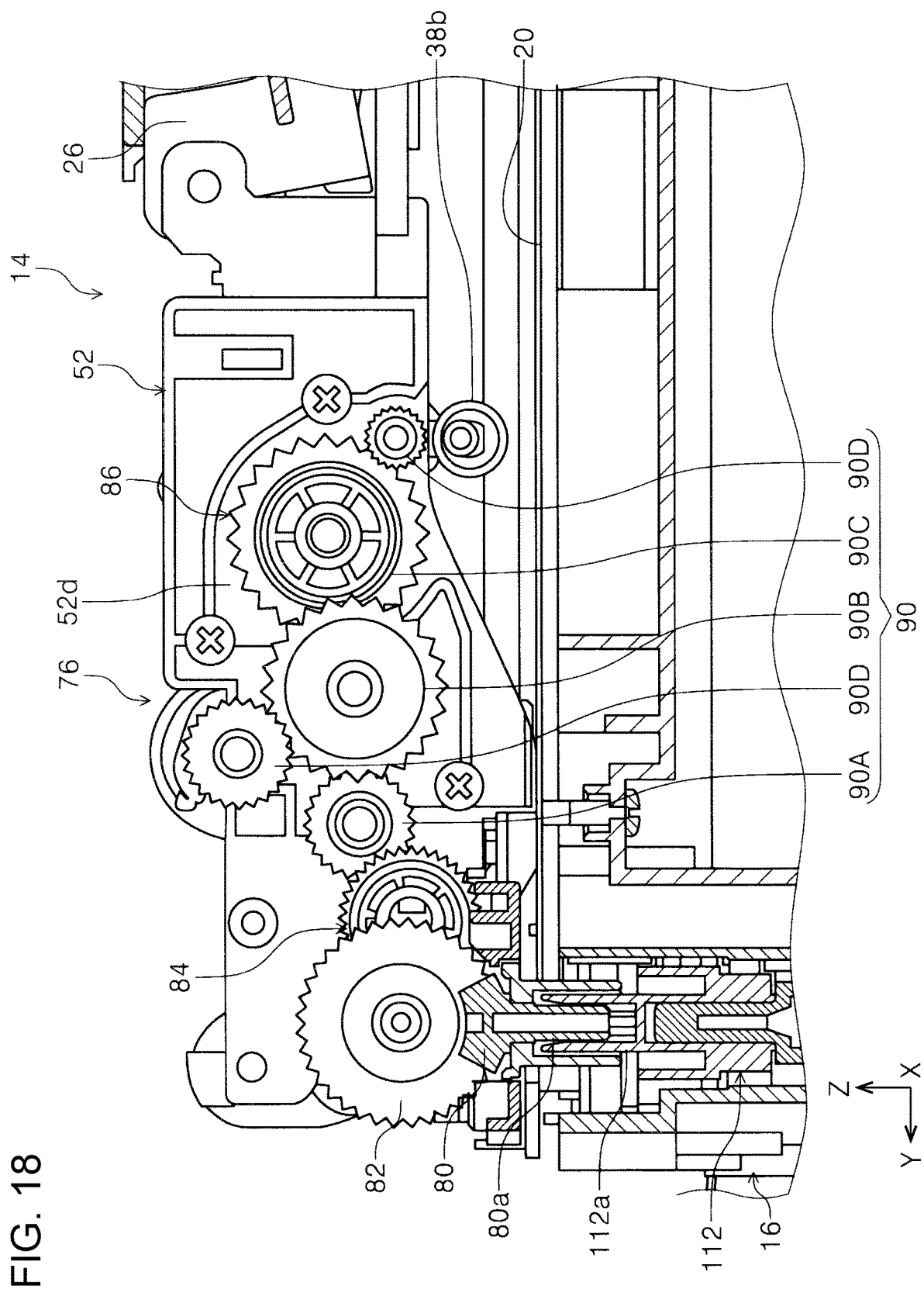
FIG. 18 is a cross-sectional side view illustrating a state of power transmission from the apparatus body to the document transport apparatus when the document transport apparatus is closed relative to the apparatus body.
Figure 19:
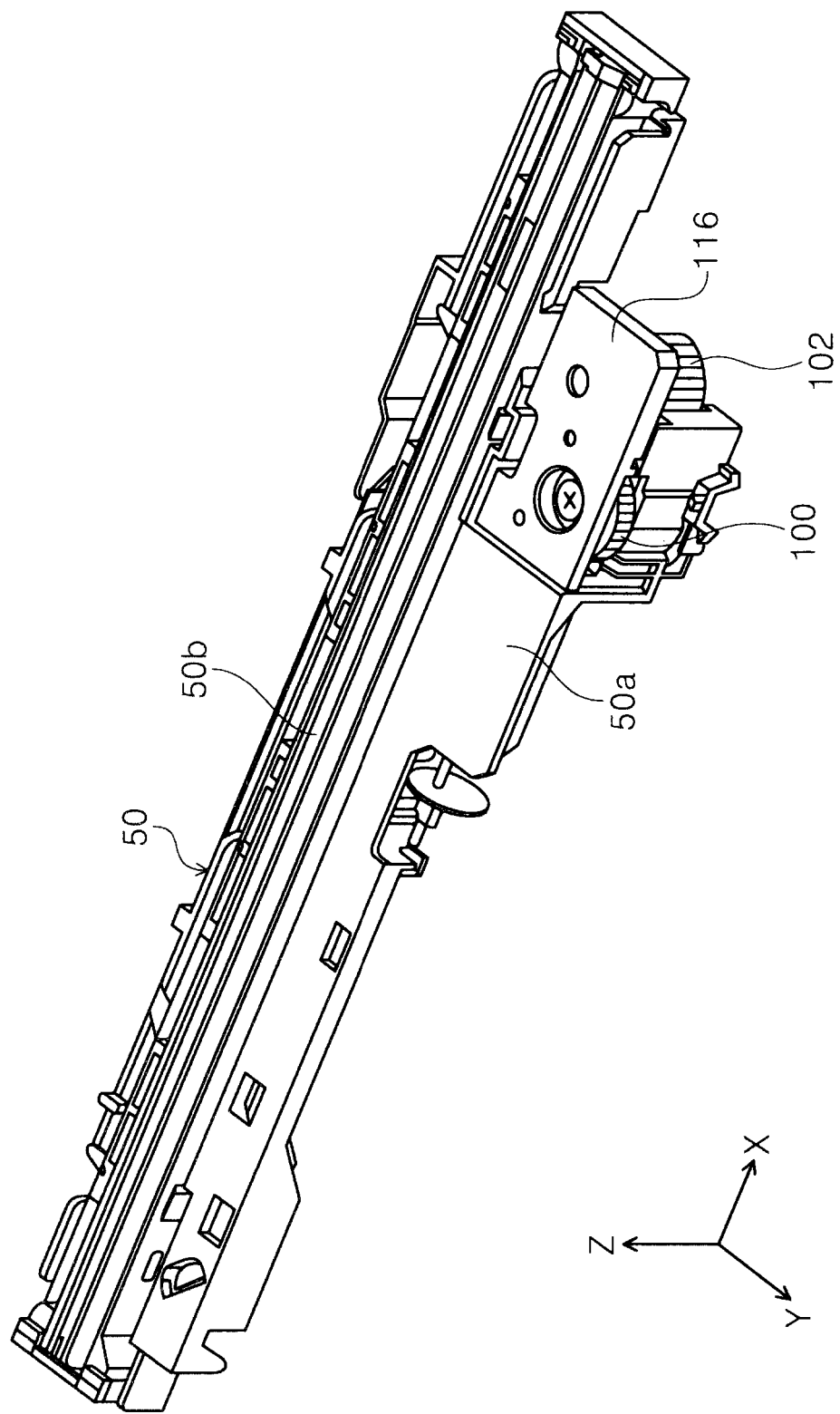
FIG. 19 is a perspective view illustrating a reading section.
Figure 20:
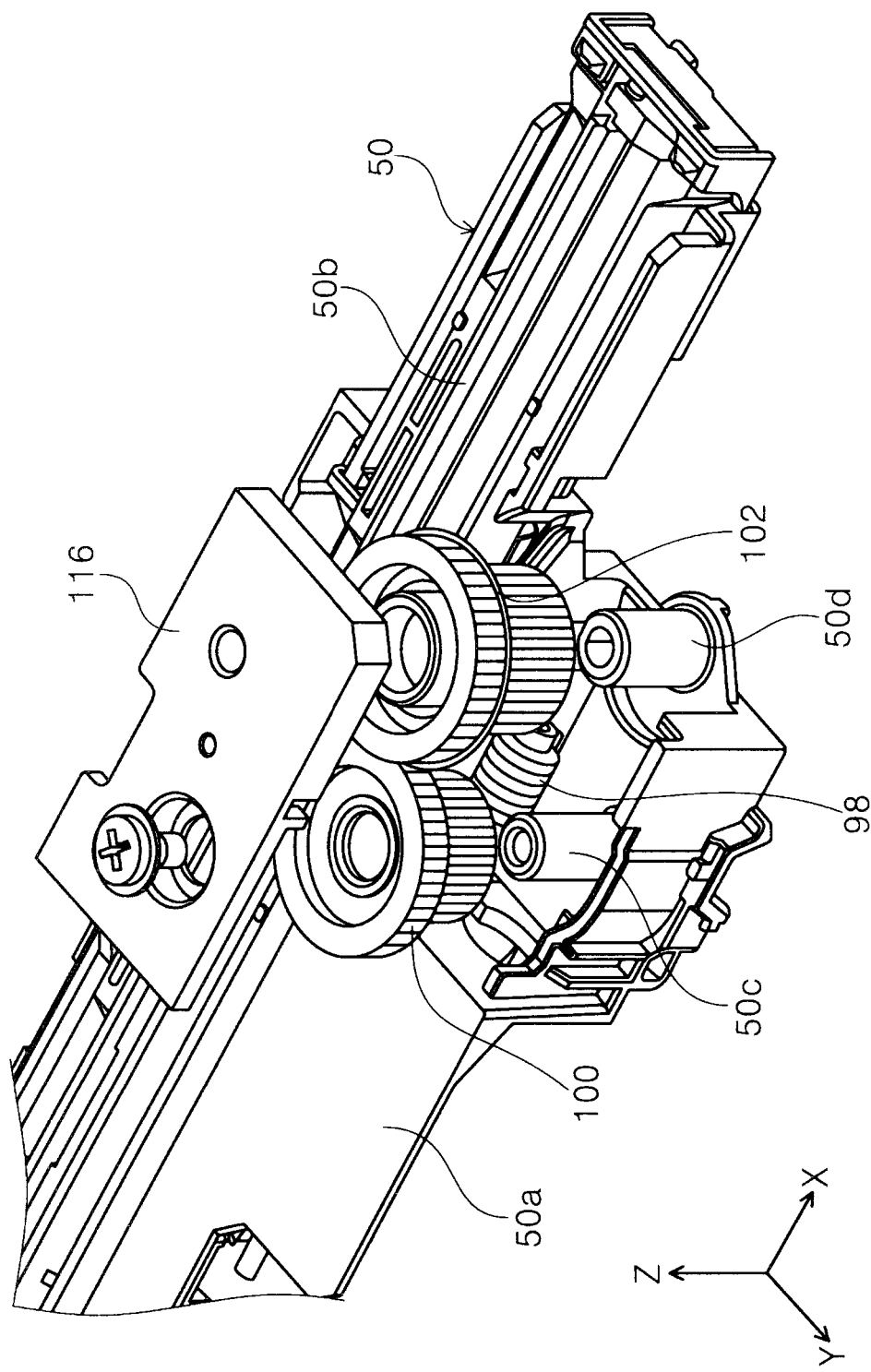
FIG. 20 is an exploded perspective view illustrating the power transmission device in the reading section.

FIG. 18 is a cross-sectional side view illustrating a state of power transmission from the apparatus body to the document transport apparatus when the document transport apparatus is closed relative to the apparatus body. FIG. 19 is a perspective view illustrating a reading section. FIG. 20 is an exploded perspective view illustrating the power transmission device in the reading section.

Figure 21:
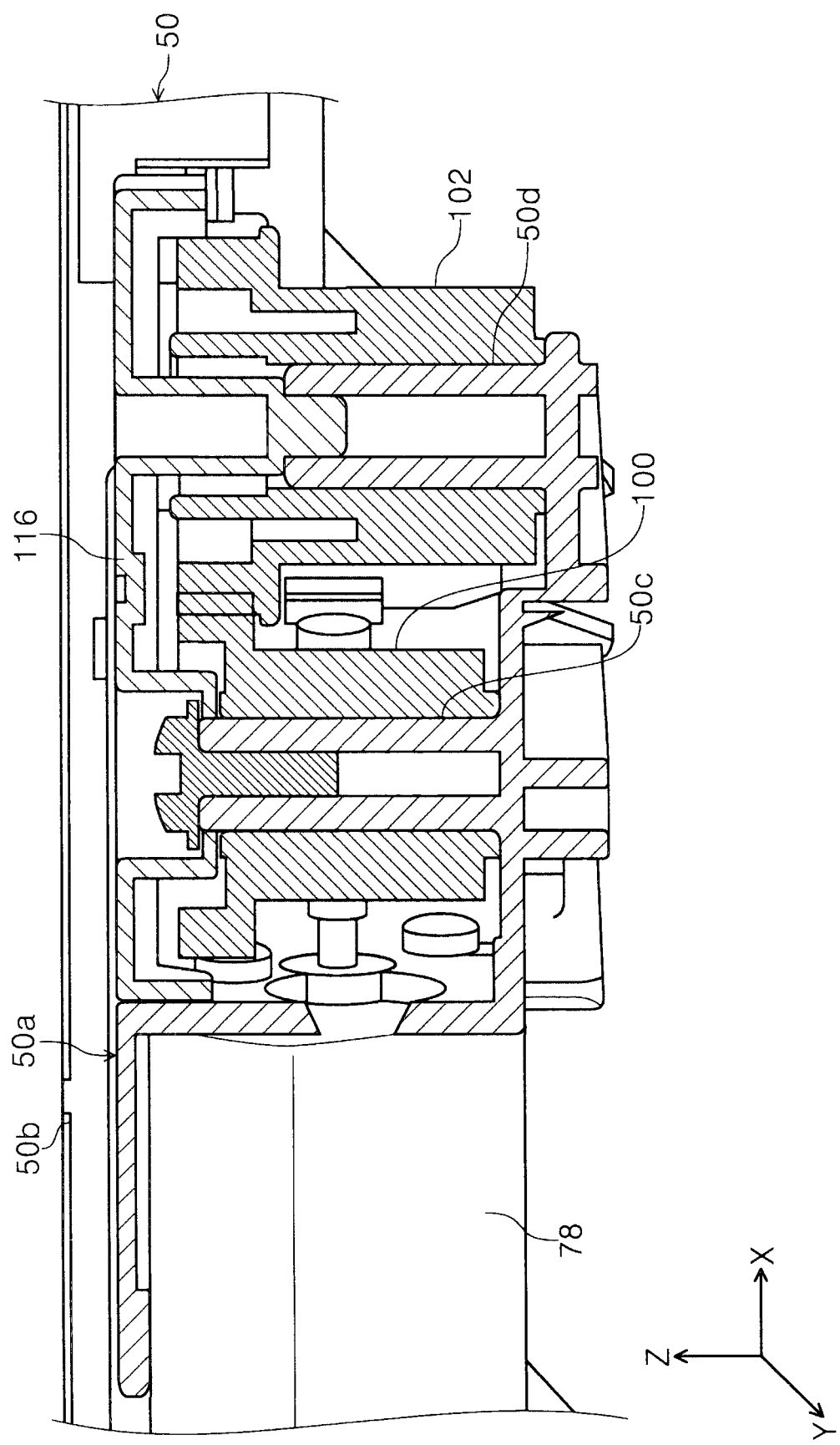
FIG. 21 is a cross-sectional side view illustrating the power transmission device in the reading section.
Figure 22:
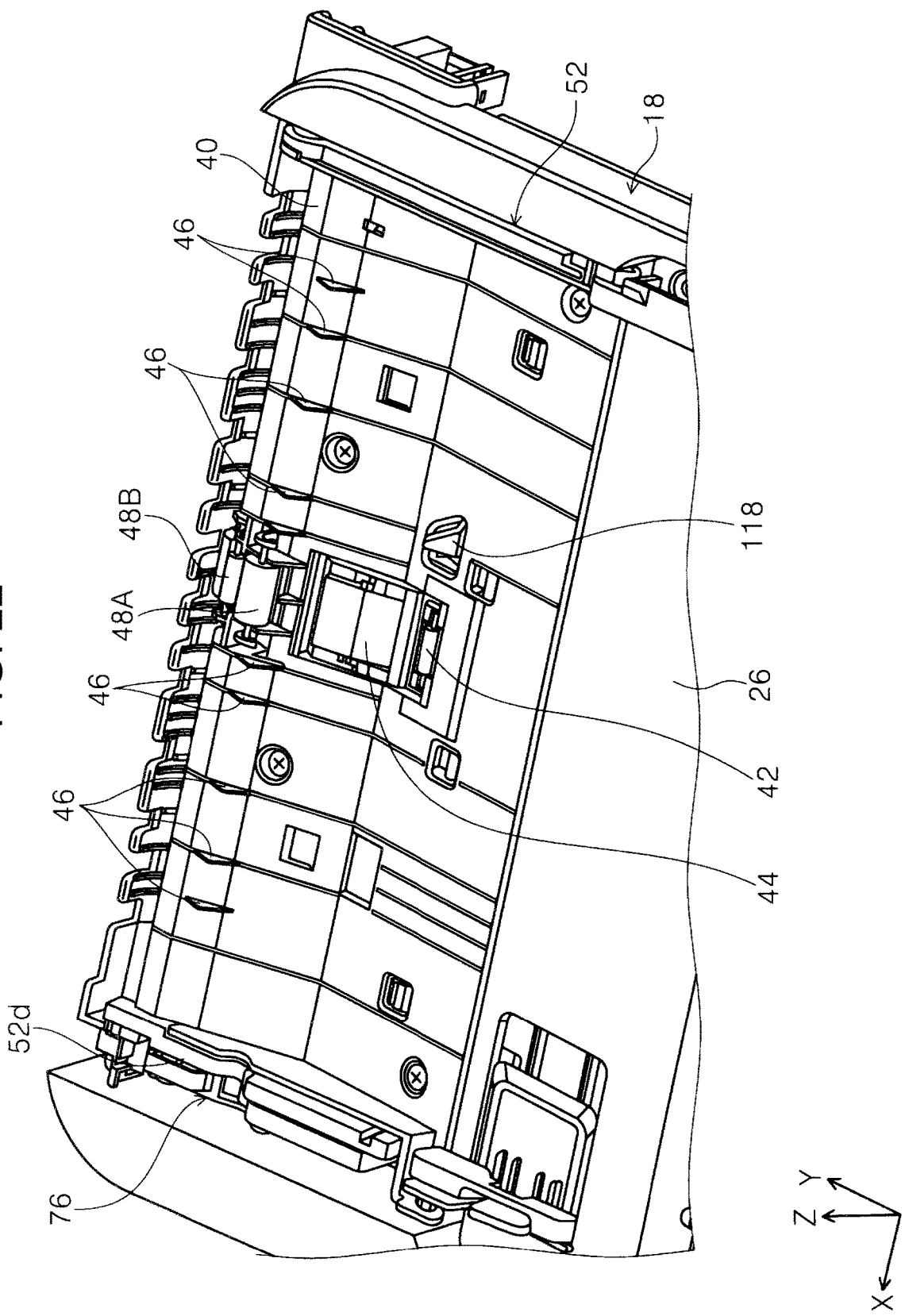
FIG. 22 is a perspective view illustrating a top side of the transport path forming unit.

FIG. 21 is a cross-sectional side view illustrating the power transmission device in the reading section. FIG. 22 is a perspective view illustrating a top side of the transport path forming unit. FIG. 23 is a cross-sectional side view illustrating a detected state and an undetected state of a document detection sensor in the transport path forming unit.

Figure 24:
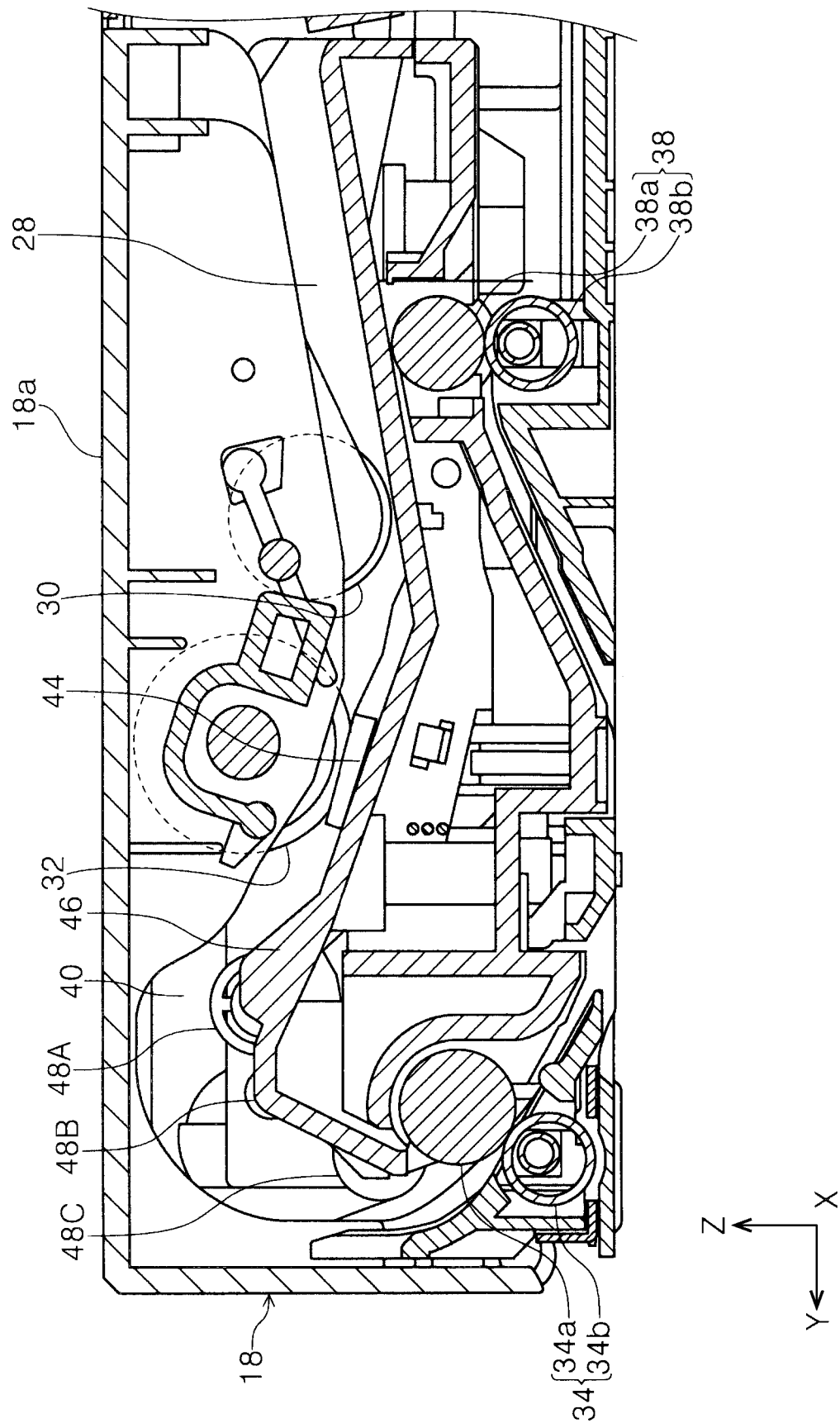
FIG. 24 is a cross-sectional side view illustrating a curved inversion section that bends and inverts a document along the document transport path.
Figure 25:
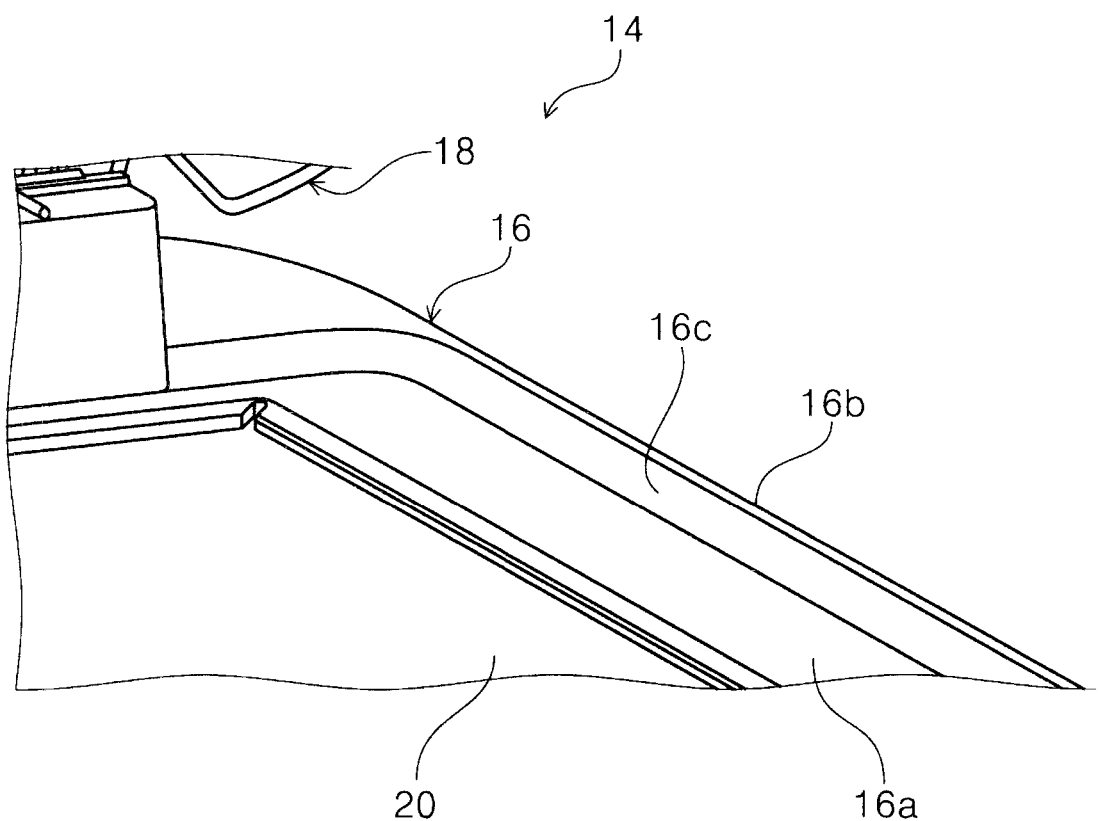
FIG. 25 is a perspective view illustrating an edge portion of the top surface of the apparatus body of the image reading apparatus.
Figure 26:
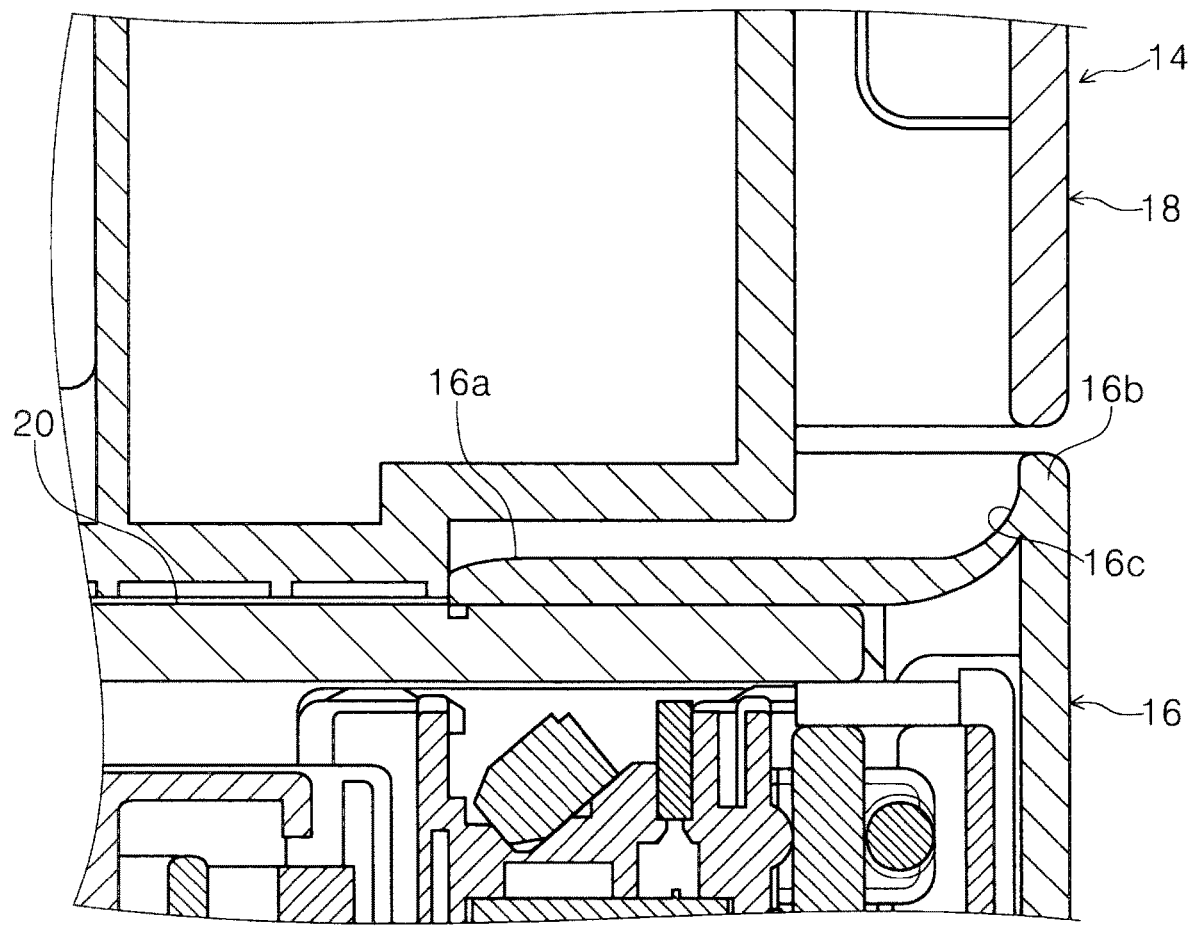
FIG. 26 is a cross-sectional side view illustrating an edge portion of the top surface of the apparatus body of the image reading apparatus.

FIG. 24 is a cross-sectional side view illustrating a curved inversion section that bends and inverts a document along the document transport path. FIG. 25 is a perspective view illustrating an edge portion of the top surface of the apparatus body of the image reading apparatus. FIG. 26 is a cross-sectional side view illustrating an edge portion of the top surface of the apparatus body of the image reading apparatus.

Note that in the X-Y-Z coordinate system that is indicated in each of the drawings, the X direction represents the width direction of a document, in other words, in the depth direction of the apparatus, the Y direction represents the transport direction of the document along the transport path in the image reading apparatus, in other words, the width direction of the apparatus, and the Z direction represents the height direction of the apparatus.

First Embodiment

Outline of Printer

An overall structure of a printer 10 will be described with reference to FIG. 1. The printer 10 is formed as an ink jet printer, which is an example of a recording apparatus. The printer 10 is formed as a multifunction machine constituted by a recording apparatus section 12 and an image reading apparatus 14. The image reading apparatus 14 is formed, for example, as a scanner unit.

In the present embodiment, the image reading apparatus 14 is rotatably connected to a backside edge of the recording apparatus section 12 in the apparatus depth direction. Although not illustrated, when the image reading apparatus 14 is rotated toward the backside of the apparatus, an upper portion of the recording apparatus section 12 will be exposed. The image reading apparatus 14 includes an apparatus body 16 and a document transport apparatus 18. In the embodiment, the document transport apparatus 18 is formed, for example, as an auto document feeder (ADF).

In FIG. 2, the document transport apparatus 18 is also rotatably connected to the backside edge of the apparatus body 16 in the apparatus depth direction. Rotating the document transport apparatus 18 toward the backside of the apparatus can expose a document placement table 20, which is otherwise called a "placement table", disposed on the top side of the apparatus body 16. In this state, a document, which is otherwise called a "medium", can be set on the document placement table 20. The document placement table 20 is formed of a glass plate that is transparent and flat. Note that photographs and text are examples of the "document" according to the embodiment.

As illustrated in FIGS. 1 and 3, a cover section 22 and a discharge tray 24 are formed on the top side of the document transport apparatus 18. The cover section 22 and the discharge tray 24 are rotatably attached to the document transport apparatus 18 and are formed so as to be switchable between an unfeedable state (FIG. 1) and a feedable state (FIG. 3). In the unfeedable state, the cover section 22 and the discharge tray 24 are positioned parallel to the X-axis and the Y-axis and constitute part of a top surface 18a of the document transport apparatus 18. With this configuration, the top surface 18a of the document transport apparatus 18 can form a flat surface, which improves the aesthetic appearance of the apparatus.

In FIG. 3, when the cover section 22 and the discharge tray 24 are switched from the unfeedable state to the feedable state, a document support section 26, which is otherwise called a "medium support section", is exposed. The document support section 26 is formed so as to enable a plurality of documents to be set thereon and support the documents in collaboration with the cover section 22 assuming the feedable state.

Document Transport Path

A document transport path 28, which is otherwise called a "medium feed path", will be described with reference to FIGS. 4 and 24. Note that in FIG. 4, the dash-dot-dot line denoted by reference P indicates a transport path of a document transported along the document transport path 28. Along the document transport path 28, a feed roller 30, a separation roller 32, a transport roller pair 34, a reading device 36, and a discharge roller pair 38 are disposed downstream of the document support section 26 in this order. Note that in the embodiment, a portion of the document transport path 28 from the separation roller 32 to the transport roller pair 34 is formed as a curved inversion path 40.

In the embodiment, the feed roller 30 is formed so as to rotate by receiving power via a first power transmission path 86 (FIG. 14), which will be described later. In the embodiment, an idler roller 42 is disposed at a position opposing the feed roller 30. The idler roller 42 is formed so as to rotate passively in conjunction with the feed roller 30. The idler roller 42 is provided to reduce friction between the feed roller 30 and an opposing surface when the feed roller 30 finishes feeding a document but is still rotating. This reduces the likelihood of read images being affected by a transport load.

A separation pad 44 is disposed at a position opposing the separation roller 32. The separation pad 44 is in contact with the separation roller 32. The separation pad 44 is made of, for example, a high-friction material. A plurality of documents fed by the feed roller 30 are separated by the separation roller 32 and the separation pad 44, and consequently, only the document with which the separation roller 32 is in contact is transported toward the transport roller pair 34 disposed downstream in the document transport direction. In the process in which the document is transported from the separation roller 32 to the transport roller pair 34, in other words, while the document passes the curved inversion path 40, the document is curved and inverted.

If the curve of the curved inversion path 40 is tight when the document passes the curved inversion path 40, the document tries to return to its original flat shape. In this instance, the document may stick to a peripheral-side surface of the curved inversion path 40, which increases the friction between the document and the curved inversion path 40 and may cause paper jamming on the curved inversion path 40. In the embodiment, as illustrated in FIG. 24, protrusions 46 that are shaped like ribs are disposed on the curved inversion path 40 at positions between the separation roller 32 and pad 44 and the transport roller pair 34.

The protruding amount of the protrusions 46 (FIGS. 22 and 24) on the curved inversion path 40 is set such that the curvature of the document on the curved inversion path 40 is made as gentle as possible. The protrusions 46 are disposed downstream of, and close to, the separation roller 32 in the document transport direction.

Moreover, a plurality of idler rollers are disposed between the transport roller pair 34 and the protrusions 46 of the curved inversion path 40 in the document transport direction. In the embodiment, three idler rollers 48A, 48B, and 48C are disposed in this order in the document transport direction. In the embodiment, a document transport speed of the transport roller pair 34 is set faster than that by the separation roller 32. When a document is nipped by the transport roller pair 34, the document is pulled by the transport roller pair 34 due to the difference in speed between the transport roller pair 34 and the separation roller 32. Accordingly, the document tends to pass the inner side of the curved inversion path 40.

The idler rollers 48A, 48B, 48C come into contact with the document that passes along the inner-side surface of the curved inversion path 40 and cause the document to pass smoothly. The idler roller 48A is disposed at a position overlapping the protrusions 46 on the document transport path, which reduces a transport load applying to the document.

As illustrated in FIG. 24, the transport roller pair 34 includes a transport drive roller 34a and an idler roller 34b. The transport drive roller 34a is formed so as to be driven by power received via a second power transmission path (FIG. 14), which will be described later. The idler roller 34b is formed so as to rotate passively in conjunction with the transport drive roller 34a.

As illustrated in FIG. 4, the reading device 36 is disposed downstream of the transport roller pair 34. The document, which has been transported to the reading device 36 by the transport roller pair 34, is read by a reading section 50 that is positioned at a position that opposes the document with the document placement table 20 interposed therebetween. The document, which has been read by the reading section 50 at the document placement table 20, is transported to the discharge roller pair 38 disposed downstream of the reading device 36 on the document transport path 28, and the discharge roller pair 38 discharges the document onto the discharge tray 24.

As illustrated in FIG. 24, the discharge roller pair 38 includes a discharge drive roller 38a and an idler roller 38b. In the embodiment, the discharge drive roller 38a is formed so as to rotate in response to power received via the first power transmission path 86 (FIG. 14), which will be described later. The idler roller 38b is formed so as to rotate passively in conjunction with the discharge drive roller 38a.

Load Applying Device

A transport path forming unit 52, which is illustrated in FIG. 5, forms the document transport path 28 and part of the curved inversion path 40 in the document transport apparatus 18. In the embodiment, the transport path forming unit 52 is made of, for example, ABS resin. A plurality of shaft support portions 52a are disposed at the +Y end of the transport path forming unit 52 in the Y direction and are arranged in a row in the X direction with an appropriate spacing therebetween. A rotating shaft 54 is rotatably mounted on the shaft support portions 52a.

As illustrated in FIG. 13, some of the shaft support portions 52a have a lubricant retainer 52b formed therein. The lubricant retainer 52b is formed, for example, as a recess so as to retain a lubricant therein. The lubricant retainer 52b supplies an appropriate amount of the lubricant to the interface between the shaft support portion 52a and the rotating shaft 54 in response to the rotation of the rotating shaft 54, thereby improving slidability of the rotating shaft 54. In the embodiment, for example, grease may be used as the lubricant.

As illustrated in FIG. 5, a position regulator 52c is formed at the +Y end of the transport path forming unit 52 in the Y direction. In the axial direction of the rotating shaft (in the X direction), the position regulator 52c is located, along the rotating shaft 54, at a position closer to one end thereof than to the other end, in other words, closer to the +X end of the rotating shaft 54 in the X direction in FIG. 5. The position regulator 52c is formed as a recess.

As illustrated in FIG. 5, for example, the transport drive roller 34a is formed on the rotating shaft 54 at two positions with a spacing therebetween in the X direction. In the embodiment, two transport drive rollers 34a are integrally formed with the rotating shaft 54 by using a double-molding method (different-material molding). In the embodiment, for example, the rotating shaft 54 is formed of a resin material (denatured polypropylene in the embodiment), whereas the transport drive rollers 34a are formed of an elastomer.

A position regulator engaging portion 54a, which is shaped like a flange, is also formed on the rotating shaft 54 at a position corresponding to the position regulator 52c in the X direction. When the rotating shaft 54 is mounted on a plurality of shaft support portions 52a, the position regulator engaging portion 54a comes within the position regulator 52c. The position regulator 52c thereby regulates the position of the rotating shaft 54 in the axial direction of the rotating shaft 54 (in the X direction) with respect to the transport path forming unit 52.

In FIG. 8, a recess 52e is formed on a +X side 52d of the transport path forming unit 52 in the X direction. The recess 52e is recessed in the −X direction from the +X side 52d. One end 54b of the rotating shaft 54 (the +X end of the rotating shaft 54 in the X direction) is formed so as to protrude within the recess 52e. On the other hand, as illustrated in the FIG. 5, the other end 54c of the rotating shaft 54 is positioned within the transport path forming unit 52 in the X direction.

In the embodiment, a transport roller driving gear 56 is fixed to the one end 54b of the rotating shaft 54. A load applying device 58 (FIGS. 6 and 7) that imparts a load onto the rotating shaft 54 is also attached to the one end 54b of the rotating shaft 54. A description of the load applying device 58 is as follows. As illustrated in FIG. 8, the load applying device 58 includes a sliding member 60, a compression spring 62, and a spring retainer 64. The transport roller driving gear 56 is formed, for example, of polyacetal resin (POM). For example, the sliding member 60 is shaped like a washer and made of Polyslider material.

As illustrated in FIGS. 9 and 10, the spring retainer 64 has a fixation portion 64a, a spring accommodation portion 64b, a groove portion 64c, and a contact portion 64d. The spring retainer 64 is formed, for example, of polystyrene resin (PS material). As illustrated in FIG. 9, a through-hole is formed in the fixation portion 64a and in the spring accommodation portion 64b. The groove portion 64c is in communication with the spring accommodation portion 64b. The contact portions 64d are formed as a pair in the groove portion 64c at positions opposing each other.

As illustrated in FIG. 10, the compression spring 62 shaped like a coil is mounted on the spring accommodation portion 64b. In the embodiment, one end of the compression spring 62 is formed so as to protrude from the coil, which serves as a stopper 62a. The stopper 62a extends from the spring accommodation portion 64b toward the groove portion 64c. The stopper 62a comes into contact with one member of the pair of the contact portions 64d disposed within the groove portion 64c and prevents the compression spring 62 from rotating on its axis.

As illustrated in FIG. 8, a spring retainer fixation portion 52f protrudes in the recess 52e of the transport path forming unit 52. As illustrated in FIG. 7, the one end 54b of the rotating shaft 54 protrudes from the recess 52e and is passed through the transport roller driving gear 56, two sliding members 60, the compression spring 62, and the through-hole of the spring accommodation portion 64b of the spring retainer 64 in this order. The fixation portion 64a of the spring retainer 64 engages the spring retainer fixation portion 52f. In this state, a fastening member 66 is passed through the through-hole of the fixation portion 64a of the spring retainer 64 and is tightened so as to fasten the spring retainer 64 to the spring retainer fixation portion 52f. The load applying device 58 is thereby mounted on the transport path forming unit 52 (FIG. 6). Note that the load applying device 58 is attached to the transport path forming unit 52 so as to enable the compression spring 62 to generate an arbitrary load (spring force).

As illustrated in FIG. 7, one end of the compression spring 62 is fixed to the transport path forming unit 52 via the spring retainer 64. The other end of the compression spring 62 presses the transport roller driving gear 56, which is fixed to the one end 54b of the rotating shaft 54, in a direction from the one end 54b of the rotating shaft 54 (from the +X end of the rotating shaft 54 in the X direction) toward the other end 54c (toward the −X end of the rotating shaft 54). Two sliding members 60 are interposed between the other end of the compression spring 62 and the transport roller driving gear 56.

The load applying device 58 thereby imparts a load onto the rotating shaft 54 from the +X end of the rotating shaft 54 toward the −X end thereof in the axial direction. The load imparted by the load applying device 58 generates a braking force (braking load) against the rotation of the rotating shaft 54 and consequently against the rotation of the transport drive rollers 34a. When a document is transported and the trailing end of the document comes off from the nip position between the separation roller 32 and the separation pad 44, the transport speed of the document transported by the transport roller pairs 34 may be disturbed. However, the load applying device 58 can reduce the disturbance in the transport speed of the document and consequently reduce the disturbance in image reading in the reading device 36.

Note that in the embodiment, the contact portion 64d restrains the compression spring 62 from rotating relative to the spring retainer 64. Accordingly, when the rotating shaft 54 rotates, the compression spring 62 does not rotate together with the rotating shaft 54. Thus, a portion where sliding occurs when the rotating shaft 54 rotates can be limited to the portion between the compression spring 62 and the sliding member 60. As a result, the sliding load is maintained stable during rotation of the rotating shaft 54, and wear of the transport roller driving gears 56 can be suppressed.

Other Examples of Load Applying Device

In the embodiment, the load applying device 58 is formed so as to impart the load from the compression spring 62 to the rotating shaft 54 in the axial direction thereof and thereby apply a braking force to the transport drive rollers 34a. However, the braking force may be applied to the rotating shaft 54, and thus to the transport drive rollers 34a, by applying a load onto the rotating shaft 54 in the radial direction thereof.

For example, as illustrated in FIG. 11, one end 68a of a torsion spring 68 engages the transport path forming unit 52, and the other end 68b is brought into contact with the circumferential surface of the rotating shaft 70. In this state, the rotating shaft 70 can be pressed in the radial direction. In addition, a groove 70a may be disposed around the circumferential surface of the rotating shaft 70 so as not to displace the other end 68b in the axial direction of the rotating shaft 70, wherein the other end 68b enters the groove 70a and presses the rotating shaft 70.

Alternatively, as illustrated in FIG. 12, one end 72a of a compression spring 72 engages the transport path forming unit 52, and the other end 72b is brought into contact with the circumferential surface of the rotating shaft 74. In this state, the rotating shaft 74 can be pressed in the radial direction thereof.

By pressing the rotating shaft 70 or 74 in a direction intersecting the axial direction (i.e., in the radial direction) by using the torsion spring 68 or by using the compression spring 72, a braking force (braking load) can be applied against the rotation of the rotating shaft 70 or 74. Thus, when a document is transported and the trailing end of the document comes off from the nip position between the separation roller 32 and the separation pad 44, the load applying device 58 can reduce the disturbance in the document transport speed of the transport roller pairs 34.

Power Transmission Device in Document Transport Apparatus

A power transmission device 76 will be described with reference to FIGS. 14 and 15. In the document transport apparatus 18, the power transmission device 76 is disposed in a +Y region of the +X side 52d of the transport path forming unit 52 that forms the document transport path 28 and the curved inversion path 40. The power transmission device 76 is formed so as to transmit the power of a drive motor 78 (FIGS. 17 and 21), which is otherwise called a "drive source" and is disposed in the apparatus body 16, to the feed roller 30, the transport drive roller 34*a*, and the discharge drive roller 38*a*. A power transmission path from the drive motor 78 within the apparatus body to the power transmission device 76 will be described later.

The power transmission device 76 is formed as a gear set that includes a first bevel gear 80, a second bevel gear 82, an input gear 84, a first power transmission path 86, and a second power transmission path 88. The first bevel gear 80 is disposed in the document transport apparatus 18 with its axis extending in the Z direction. The first bevel gear 80 is formed so as to rotate by receiving power transmitted from the drive motor 78 (FIGS. 17 and 21). The first bevel gear 80 engages the second bevel gear 82. In the embodiment, the second bevel gear 82 is formed, for example, as a composite gear. The second bevel gear 82 has a spur gear (not shown), and the spur gear engages the input gear 84.

Accordingly, when the first bevel gear 80 rotates by receiving power from the drive motor 78 (FIGS. 17 and 21), the second bevel gear 82 and the input gear 84 also rotate. As illustrated in FIGS. 14 and 15, the input gear 84 is disposed in the power transmission device 76 at a position where the power is distributed to the first power transmission path 86 and to the second power transmission path 88.

In the embodiment, the input gear 84, which is formed as a composite gear, includes a first input gear 84A that transmits power to the first power transmission path 86 and a second input gear 84B that transmits power to the second power transmission path 88. Note that first input gear 84A is formed so as to engage the spur gear (not shown) of the second bevel gear 82 and receive power from the drive motor 78 (FIGS. 17 and 21).

First Power Transmission Path

The first power transmission path 86 is formed as a gear set including a plurality of gears. The first power transmission path 86 includes gears 90A, 90B, 90C, 90D, and 90E. The gear 90A engages the first input gear 84A. The gear 90B engages the gear 90A, the gear 90C, and the gear 90D individually. The gear 90C engages the gear 90E.

When the first input gear 84A is caused to rotate by the power received from the drive motor 78 (FIGS. 17 and 21), the gears 90A, 90B, and 90C subsequently rotate.

Consequently, the gear 90D rotates in conjunction with the rotation of the gear 90B that engages the gear 90D. The gear 90D is fixed to the +X end of a rotating shaft 92 in the X direction. In the embodiment, although not illustrated, the rotation of the rotating shaft 92 transmits power to the feed roller 30 and the separation roller 32.

Moreover, the rotation of the gear 90C that engages the gear 90E causes the gear 90E to rotate. As illustrated in FIG. 16, the discharge drive roller 38*a* is fixed to a rotating shaft 94 that rotates together with the gear 90E. In the embodiment, the discharge drive roller 38*a* is disposed on a rotating shaft 94 at two positions with a spacing therebetween in the X direction. Note that the gear 90E is fixed to the +X end of the rotating shaft 94 in the X direction. Accordingly, when the gear 90E rotates, the discharge drive rollers 38*a* are caused to rotate via the rotating shaft 94.

Second Power Transmission Path

As illustrated in FIG. 15, the second power transmission path 88 includes a gear 96 and the transport roller driving gear 56. The gear 96 engages the second input gear 84B. The transport roller driving gear 56 engages the gear 96. When the second input gear 84B rotates, the transport roller driving gear 56 that engages the gear 96 is rotationally driven, via the gear 96, by the second input gear 84B. In the embodiment, the gear 96 is disposed, together with the transport roller driving gear 56, within the recess 52*e* (FIG. 8) on the +X side 52*d* of the transport path forming unit 52.

When the input gear 84 rotates in a predetermined direction (counterclockwise in FIG. 15) by receiving power from the drive motor 78 (FIGS. 17 and 21), the rotation of the input gear 84 causes the feed roller 30, the transport drive roller 34*a*, and the discharge drive roller 38*a* to rotate in a direction of transporting a document from an upstream region to a downstream region along the document transport path 28.

In FIG. 16, the dash-dot-dot line denoted by reference X1 indicates the +X end of the document transport path 28 (curved inversion path 40) in the document width direction (in the X direction). In the embodiment, at least a portion of the transport roller driving gear 56 is present inside the dash-dot-dot line X1 in the X direction, in other words, within the curved inversion path 40. As a result, the transport roller driving gear 56 can transmit power (torque) to the transport drive rollers 34*a* at a position close to the transport drive rollers 34*a* in the X direction, thereby suppressing torsion of the rotating shaft 54. Similarly, the load applying device 58 can apply a load (braking force) to the transport drive rollers 34*a* at a position close to the transport drive rollers 34*a*, thereby suppressing the torsion of the rotating shaft 54.

Transmission Path of Power from Apparatus Body to Document Transport Apparatus

Next, a transmission path of power from the apparatus body 16 to the document transport apparatus 18 will be described with reference to FIGS. 17 to 21. As illustrated in FIG. 17, the reading section 50 is disposed inside the apparatus body 16. The reading section 50 is formed, for example, so as to be movable in the Y direction by using a rack and pinion mechanism. As illustrated in FIG. 19, the reading section 50 has a carriage 50*a*. The carriage 50*a* includes a sensor 50*b* that extends in the X direction, the drive motor 78 (FIGS. 17 and 21), a driving gear 98 (FIGS. 17 and 20), a gear 100, and a pinion 102.

The sensor 50*b* is formed, for example, as a contact image sensor module (CISM). The length of the sensor 50*b* in the X direction corresponds to the length of the document placement table 20 in the X direction.

The driving gear 98 is fixed to the drive shaft of the drive motor 78. The driving gear 98 engages the gear 100. The gear 100 engages the pinion 102. When the drive motor 78 is rotationally driven such that the pinion 102 in FIG. 17 rotates clockwise, the pinion 102 engages a rack 104 and moves the reading section 50 in the −Y direction. This enables the reading section 50 to read a document that is placed on the document placement table 20 while the reading section 50 moves in the Y direction.

In FIG. 17, when the reading section 50 is positioned in a +Y end region in the Y direction within the apparatus body 16 and, in this state, the drive motor 78 is rotationally driven such that the pinion 102 rotates counterclockwise, the reading section 50 remains to be in the +Y end region within the apparatus body 16 but the pinion 102 begins to engage a gear 106 disposed in the apparatus body 16. A gear 108, a gear 110, and a composite gear 112 are also disposed within the apparatus body 16. The gear 108 engages the gear 106. The gear 110 engages the gear 108, and the composite gear 112 engages the gear 110.

The composite gear 112 has an engaging portion 112*a* (FIG. 18) that is shaped like a pipe and formed so as to protrude upward (in the Z direction). On the other hand, as illustrated in FIG. 18, a connection portion 80*a* is disposed at the bottom end of the first bevel gear 80. As illustrated in FIG. 18, when the document transport apparatus 18 is closed relative to the apparatus body 16, the connection portion 80*a* and the engaging portion 112*a* are connected to each other.

As a result, the composite gear 112 and the first bevel gear 80 can rotate together as one body. When the composite gear 112 is caused to rotate counterclockwise in FIG. 17 by power from the drive motor 78 (FIGS. 17 and 21), the first bevel gear 80 rotates in the same direction. The power of the drive motor 78 is transmitted to the first bevel gear 80, and consequently to the power transmission device 76. In the embodiment, a plurality of gears including those from the gear 100 to the composite gear 112 constitute a third power transmission path 114 (FIG. 17) that transmits power from the drive motor 78 to the power transmission device 76 disposed in the document transport apparatus 18.

Structure of Reading Section

As illustrated in FIGS. 19 to 21, the carriage 50*a* in the reading section 50 has supporting shafts 50*c* and 50*d* (FIG. 20). The gear 100 is inserted to the supporting shaft 50*c* so as to be rotatable relative to the supporting shaft 50*c*. Similarly, the pinion 102 is inserted to the supporting shaft 50*d* so as to be rotatable relative to the supporting shaft 50*d*.

As illustrated in FIG. 21, a cover member 116 (FIG. 20) is attached to the carriage 50*a* while the gear 100 and the pinion 102 are inserted to the supporting shafts 50*c* and 50*d*, respectively. When the cover member 116 is mounted on the carriage 50*a*, the cover member 116 defines the top positions of the supporting shafts 50*c* and 50*d*. The cover member 116 serves as a lid while the gear 100 and the pinion 102 are installed to respective supporting shafts 50*c* and 50*d*. The gear 100 or the pinion 102 can be thereby prevented from coming off from the supporting shaft 50*c* or 50*d*.

Moreover, since the cover member 116 defines the top positions of the supporting shaft 50*c* and 50*d* while the cover member 116 is mounted on the carriage 50*a*, the distance between the supporting shafts 50*c* and 50*d* is fixed. When the document transport apparatus 18 is given a shock, the shock may cause the gear 100 and the pinion 102 to rotate separately and change the distance between the supporting shaft 50*c* and the supporting shaft 50*d*.

This may change the engagement between the gear 100 and the pinion 102, causing skipping or damage of gear teeth between the gear 100 and the pinion 102. In the embodiment, the cover member 116, which regulates the distance between the supporting shaft 50*c* and the supporting shaft 50*d*, can suppress changes in the distance that are caused by a shock. As a result, an appropriate engagement between the gear 100 and the pinion 102 can be maintained, which prevents the gear teeth from skipping or being damaged.

Document Detection Lever

A document detection lever 118 will be described with reference to FIGS. 22 and 23. On the document transport path 28, a document detection lever 118 is disposed at a position corresponding to the feed roller 30 in the document transport direction. More specifically, as illustrated in FIG. 22, the document detection lever 118 is disposed in the transport path forming unit 52. The document detection lever 118 is formed so as to be switchable between a protruding position in which the lever protrudes toward the document transport path 28 as illustrated in the top view in FIG. 23 and a withdrawn position in which the lever is withdrawn from the document transport path 28 as illustrated in the bottom view in FIG. 23. In the embodiment, the document detection lever 118 is formed as a lever member that is swingable with respect to the transport path forming unit 52.

In FIG. 23, the dash-dot-dot line denoted by reference N1 schematically indicates the nip position between the feed roller 30 and the idler roller 42. In the embodiment, the document detection lever 118 is disposed, in the document transport direction, at a position corresponding to the nip position N1 between the feed roller 30 and the idler roller 42. As illustrated in the bottom view in FIG. 23, when the leading end of a document P (the bottom view in FIG. 23) is inserted to the nip position N1 between the feed roller 30 and the idler roller 42 on the document transport path 28, the leading end of the document P pushes the document detection lever 118 downward, and the document detection lever 118 is switched from the protruding position in which the lever protrudes toward document transport path 28 to the withdrawal position in which the lever is withdrawn from the document transport path 28. This causes the document detection lever 118 to assume a document-detected state.

In the embodiment, the position at which the document detection lever 118 is caused to assume the document-detected state is located downstream of the nip position N1 between the feed roller 30 and the idler roller 42. Thus, when the document detection lever 118 assumes the document-detected state, the leading end of the document P has already been nipped by the feed roller 30 and the idler roller 42, which suppresses or reduces document feed errors.

Edge Shape of Top Surface of Apparatus Body of Image Reading Apparatus

Next, the shape of an edge portion 16*b* of a top surface 16*a* of the apparatus body 16 of the image reading apparatus 14 will be described with reference to FIGS. 2, 25, and 26. In the embodiment, an edge portion 16*b*, which is shaped like a rib, is formed on the side surfaces (the +Y side and the −Y side) and the front surface (the +X side) of the apparatus so as to surround the document placement table 20 on the top surface 16*a* of the apparatus body 16. The edge portion 16*b* is also formed on part of the rear surface of the apparatus (FIG. 25).

As illustrated in FIGS. 25 and 26, a curved portion 16*c* is formed in the edge portion 16*b*. As illustrated in FIG. 26, the curved portion 16*c* is formed like a bowl when viewed in a direction intersecting the apparatus height direction. When the document transport apparatus 18 is closed relative to the apparatus body 16 with a document being placed on the document placement table 20, the document may be pinched and damaged between the document placement table 20 and the document transport apparatus 18. The curved portion 16*c*, which is formed in the edge portion 16*b* that surrounds the document placement table 20, can reduce the likelihood of the document being pinched and damaged between the document placement table 20 and the document transport apparatus 18.

Modification Example of Embodiment

According to the embodiment, the document detection lever 118 is formed as the lever member that is swingable with respect to the transport path forming unit 52. However, in place of this configuration, the document detection lever 118 may be formed, for example, as an optical sensor or an ultrasonic sensor that detects the leading end of a document P at a position downstream of the nip position N1 between the feed roller 30 and the idler roller 42 in the document transport direction.

In summary, the image reading apparatus 14 includes the document support section 26 that supports a document before feeding, the document transport path 28 on which the document fed from the document support section 26 is transported, the reading section 50 that reads the document that has passed through the document transport path 28, the transport drive rollers 34a that are disposed upstream of the reading section 50 and transports the document to the reading section 50, and the load applying device 58 that applies a load against rotation of the transport drive rollers 34a.

According to this configuration, the image reading apparatus 14 includes the transport drive rollers 34a that are disposed upstream of the reading section 50 and transports the document to the reading section 50 and the load applying device 58 that applies a load against rotation of the transport drive rollers 34a. Thus, when the trailing end of a document comes off from a nip position (at which the document is nipped) upstream of the transport drive rollers 34a, more specifically, from the nip position of the separation roller 32 and the separation pad 44, the load applying device 58 applies a braking force against rotation of the transport drive rollers 34a, which can efficiently suppress disturbance in the document transport speed of the transport drive rollers 34a.

The transport drive rollers 34a are disposed on the rotating shaft 54 that extends in the document width direction (in the X direction) that intersects the document transport direction (in the Y direction), and the load applying device 58 imparts a load by pressing the transport roller driving gear 56 disposed at one end (the +X end) of the rotating shaft 54 in a direction from the one end (the +X end) of the rotating shaft 54 to the other end (the −X end) thereof.

The image reading apparatus 14 further includes the position regulator 52c that regulates the position of the rotating shaft 54 in the rotation axis direction (in the X direction) of the rotating shaft 54. The position regulator 52c is disposed at a position closer to the one end (the +X end) of the rotating shaft 54 than to the other end thereof in the rotation axis direction (in the X direction).

According to this configuration, the position at which the load applying device 58 imparts a load onto the rotating shaft 54 is closer to the one end (the +X end) of the rotating shaft 54, and the position of the position regulator 52c that regulates the position of the rotating shaft 54 in the rotation axis direction is also closer to the one end (the +X end) of the rotating shaft 54. This can reduce the length of section of the rotating shaft 54 in which torsion occurs and thereby can suppress disturbance in transport speed caused by the torsion of the rotating shaft 54.

At least a portion of the transport roller driving gear 56 is present within the document transport path 28 in the document width direction (in the X direction). With this configuration, the distance between the transport drive rollers 34a and the position at which torque is transmitted to the rotating shaft 54 of the transport drive rollers 34a becomes short, thereby reducing torsion of the rotating shaft 54 and consequently suppressing deterioration in the document transport accuracy of the transport drive rollers 34a.

The image reading apparatus 14 further includes the power transmission device 76 that transmits power from the drive motor 78 to the transport roller driving gear 56 and the transport path forming unit 52 that forms the document transport path 28 and supports the power transmission device 76 on one side (i.e., the +X side 52d) of the transport path forming unit 52 in the document width direction (in the X direction). The transport path forming unit 52 has the recess 52e formed on the +X side 52d of the transport path forming unit 52, and at least a portion of the power transmission device 76, more specifically, at least the transport roller driving gear 56 and the gear 96, is present in the recess 52e. With this configuration, an increase in the size of the apparatus caused by installation of the power transmission device 76 can be suppressed.

The transport path forming unit 52 includes the shaft support portions 52a that supports the rotating shaft 54 and the lubricant retainers 52b that retain grease (lubricant) to be supplied to the shaft support portions 52a. With this configuration, the grease (lubricant) supplied by the lubricant retainers 52b can reduce wear and tear of the shaft support portions 52a and the rotating shaft 54.

The load applying device 58 includes a compression spring 62, and the compression spring 62 exerts a spring force on the spring retainer 64 disposed in the recess 52e and on the transport roller driving gear 56. With this configuration, the load applying device 58 can be formed in a simple structure and at a low cost.

The compression spring 62 is fixed to the spring retainer 64, and the sliding member 60 is disposed between the compression spring 62 and the transport roller driving gear 56. With this configuration, a sliding portion where sliding occurs when the rotating shaft 54 rotates can be limited to the portion between the compression spring 62 and the sliding member 60. As a result, the sliding load is maintained stable during rotation of the rotating shaft 54, and wear of the transport roller driving gears 56 can be reduced.

The transport drive rollers 34a and the rotating shaft 54 are formed of resin materials by using a double-molding method (different-material molding). In the embodiment, the rotating shaft 54 is formed of a resin material, and the transport drive rollers 34a are formed of elastomer. With this configuration, the rotating shaft 54 and the transport drive rollers 34a can be formed at a low cost.

The image reading apparatus 14 further includes the apparatus body 16 that includes the reading section 50 and the document placement table 20 on which a document is placed and the document transport apparatus 18 that is disposed so as to be openable relative to the apparatus body 16 and that transports the document to a reading region on the document placement table 20. The document transport apparatus 18 is formed of the document support section 26, the document transport path 28, and the transport drive rollers 34a. The apparatus body 16 includes the drive motor 78 that provides power to be transmitted to the transport drive rollers 34a, and the drive motor 78 is used for moving the reading section 50 relative to the document placement table 20. When the document transport apparatus 18 is closed relative to the apparatus body 16, the third power transmission path 114, which is the transmission path for transmitting driving power from the drive motor 78 to the transport drive rollers 34a, is formed.

With this configuration, the drive motor 78 is used to drive both the document transport apparatus 18 and the reading section 50, which can reduce the cost of the apparatus.

In this embodiment, the load applying device 58 according to the invention is applied to an ink jet printer, which is an example of a recording apparatus. However, the load applying device 58 can be applied to other types of liquid ejecting apparatuses. Here, the liquid ejecting apparatuses are not limited to recording apparatuses, such as printers, copiers, and facsimiles, that use an ink-jet type recording head and perform recording onto a recording medium by ejecting ink from the recording head. The liquid ejecting apparatuses also include apparatuses in which a liquid ejecting head, which corresponds to the ink-jet type recording head, ejects liquid, instead of ink, that matches a particular application onto a liquid receiving medium, which corresponds to a recording medium, and adheres the liquid to the liquid receiving medium.

Examples of the liquid ejecting head include, in addition to the recording head, a color material ejecting head that is used in manufacturing color filters for liquid crystal displays, etc., an electrode material (conductive paste) ejecting head that is used for forming electrodes for organic electroluminescence displays, field emission displays (FED), etc., a living organic material ejecting head that is used in manufacturing biochips, and a test material ejecting head that is used as a precision pipet. Note that the invention is not limited to the embodiments described above and various modifications can be made, and thereby included, within the scope of the invention set forth in the claims.

The entire disclosure of Japanese Patent Application No. 2017-135494, filed Jul. 11, 2017 is expressly incorporated by reference herein.

What is claimed is:

1. An image reading apparatus, comprising:
   a medium support section that supports a medium before feeding;
   a reading section that reads the medium that feeds from the medium support section;
   a transport roller that is disposed upstream of the reading section and transports the medium to the reading section; and
   a load applying device that applies a load against rotation of the transport roller,
   wherein the transport roller is disposed on a rotating shaft that extends in a medium width direction that intersects the medium transport direction, and
   wherein the load applying device applies the load by pressing a transport roller driving gear disposed at one end of the rotating shaft in a direction from the one end of the rotating shaft to the other end thereof.

2. The image reading apparatus according to claim 1, further comprising
   a position regulator that regulates a position of the rotating shaft in a rotation axis direction of the rotating shaft, wherein
   the position regulator is disposed at a position closer to the one end of the rotating shaft than to the other end thereof in the rotation axis direction.

3. The image reading apparatus according to claim 2, wherein at least a portion of the transport roller driving gear is present within a medium transport region in the medium width direction.

4. The image reading apparatus according to claim 3, further comprising:
   gear set that transmits power from a drive source to the transport roller driving gear; and
   a transport path forming unit that supports the gear set on one side of the transport path forming unit in the medium width direction, wherein
   the transport path forming unit has a recess formed on the one side, and at least a portion of the gear set is present in the recess.

5. The image reading apparatus according to claim 4, wherein the transport path forming unit includes
   a shaft support portion that supports the rotating shaft and
   a lubricant retainer that retains a lubricant to be supplied to the shaft support portion.

6. The image reading apparatus according to claim 4, wherein
   the load applying device includes a compression spring, and
   the compression spring exerts a spring force on the spring retainer disposed in the recess and on the transport roller driving gear.

7. The image reading apparatus according to claim 6, wherein
   the compression spring is fixed to the spring retainer, and
   a sliding member is disposed between the compression spring and the transport roller driving gear.

8. The image reading apparatus according to claim 1, wherein the transport roller and the rotating shaft are formed by using two types of resin materials.

9. An image reading apparatus, comprising:
   a medium support section that supports a medium before feeding;
   a reading section that reads the medium that feeds from the medium support section;
   a transport roller that is disposed upstream of the reading section and transports the medium to the reading section;
   a load applying device that applies a load against rotation of the transport roller;
   an apparatus body that includes the reading section and a placement table on which a document is placed; and
   a document transport apparatus that is disposed so as to be openable relative to the apparatus body and that transports the document to a reading region on the placement table, wherein
   the document transport apparatus is formed of the medium support section, and the transport roller,
   the apparatus body includes a drive source that provides power to be transmitted to the transport roller, and the drive source is used for moving the reading section relative to the placement table, and
   when the document transport apparatus is closed relative to the apparatus body, a transmission path for transmitting driving power from the drive source to the transport roller is formed.

* * * * *